United States Patent
Bezos et al.

(10) Patent No.: US 7,222,087 B1
(45) Date of Patent: May 22, 2007

(54) METHOD AND SYSTEM FOR PLACING A PURCHASE ORDER VIA A COMMUNICATIONS NETWORK

(75) Inventors: Jeffrey P. Bezos, Seattle, WA (US);
Maryam Mohit, Seattle, WA (US);
James Prudente, Seattle, WA (US);
Colleen McQueen, Seattle, WA (US);
Gene Pope, Issaquah, WA (US);
Sheldon J. Kaphan, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/151,617

(22) Filed: Sep. 11, 1998

Related U.S. Application Data

(63) Continuation-in-part of application No. 09/046,503, filed on Mar. 23, 1998, now abandoned, and a continuation-in-part of application No. 08/928,951, filed on Sep. 12, 1997, now Pat. No. 5,960,411.

(51) Int. Cl.
*G06Q 30/00* (2006.01)

(52) U.S. Cl. ...................................... 705/26
(58) Field of Classification Search .................. 705/26, 705/27
See application file for complete search history.

(56) References Cited

U.S. PATENT DOCUMENTS

| | | | |
|---|---|---|---|
| 4,937,863 A | 6/1990 | Robert et al. ............... | 710/200 |
| 5,204,897 A | 4/1993 | Wyman ...................... | 710/200 |
| 5,260,999 A | 11/1993 | Wyman ....................... | 705/59 |

(Continued)

FOREIGN PATENT DOCUMENTS

EP   WO 95/30961   11/1995

(Continued)

OTHER PUBLICATIONS

Business Wire p04281561-Apr. 28, 1998-"Modcomp Provides ViewMax Most to Web Integration Solution for VWR Scientific Products: Internet Electronic Commerce System".*

(Continued)

*Primary Examiner*—Nicholas D. Rosen
(74) *Attorney, Agent, or Firm*—Perkins Coie LLP

(57) ABSTRACT

A method and system for placing an order to purchase an item via the Internet. The order is placed by a purchaser at a client system and received by a server system. The server system receives purchaser information including identification of the purchaser, payment information, and shipment information from the client system. The server system then assigns a client identifier to the client system and associates the assigned client identifier with the received purchaser information. The server system sends to the client system the assigned client identifier and an HTML document identifying the item and including an order button. The client system receives and stores the assigned client identifier and receives and displays the HTML document. In response to the selection of the order button, the client system sends to the server system a request to purchase the identified item. The server system receives the request and combines the purchaser information associated with the client identifier of the client system to generate an order to purchase the item in accordance with the billing and shipment information whereby the purchaser effects the ordering of the product by selection of the order button.

55 Claims, 23 Drawing Sheets

U.S. PATENT DOCUMENTS

| | | | | |
|---|---|---|---|---|
| 5,451,998 | A | | 9/1995 | Hamrick ................... 725/60 |
| 5,513,117 | A | * | 4/1996 | Small ..................... 700/233 |
| 5,515,268 | A | * | 5/1996 | Yoda ...................... 705/26 |
| 5,627,940 | A | | 5/1997 | Rohra et al. .............. 704/9 |
| 5,640,501 | A | | 6/1997 | Turpin .................... 715/507 |
| 5,640,577 | A | | 6/1997 | Scharmer .................. 715/507 |
| 5,664,111 | A | | 9/1997 | Nahan et al. .............. 705/27 |
| 5,710,887 | A | * | 1/1998 | Chelliah et al. ........... 705/26 |
| 5,715,314 | A | * | 2/1998 | Payne et al. .............. 380/24 |
| 5,715,399 | A | | 2/1998 | Bezos ..................... 705/27 |
| 5,727,163 | A | | 3/1998 | Bezos ..................... 705/27 |
| 5,745,681 | A | | 4/1998 | Levine et al. ............. 709/200 |
| 5,758,126 | A | | 5/1998 | Daniels et al. ............ 715/780 |
| 5,819,034 | A | | 10/1998 | Joseph et al. ............. 709/201 |
| 5,826,242 | A | * | 10/1998 | Montulli .................. 705/27 |
| 5,860,068 | A | * | 1/1999 | Cook ...................... 705/26 |
| 5,870,716 | A | * | 2/1999 | Sugiyama et al. ........... 705/26 |
| 5,870,717 | A | * | 2/1999 | Wiecha .................... 705/26 |
| 5,890,137 | A | * | 3/1999 | Koreeda ................... 705/26 |
| 5,897,622 | A | * | 4/1999 | Blinn et al. .............. 705/26 |
| 5,899,980 | A | * | 5/1999 | Wilf et al. ............... 705/26 |
| 5,970,472 | A | * | 10/1999 | Allsop et al. ............. 705/26 |
| 5,971,273 | A | * | 10/1999 | Vallaire .................. 235/381 |
| 5,983,199 | A | * | 11/1999 | Kaneko .................... 705/26 |
| 5,991,739 | A | * | 11/1999 | Cupps et al. .............. 705/26 |
| 5,995,626 | A | * | 11/1999 | Nishioka et al. ........... 380/25 |
| 6,009,413 | A | * | 12/1999 | Webber et al. ............. 705/26 |
| 6,026,376 | A | | 2/2000 | Kenney .................... 705/27 |
| 6,035,283 | A | * | 3/2000 | Rofrano ................... 705/27 |
| 6,085,168 | A | * | 7/2000 | Mori et al. ............... 705/17 |
| 6,085,170 | A | * | 7/2000 | Tsukuda ................... 705/26 |
| 6,088,700 | A | * | 7/2000 | Larsen et al. ............. 707/10 |
| 6,101,482 | A | * | 8/2000 | DiAngelo et al. ........... 705/26 |
| 6,101,483 | A | * | 8/2000 | Petrovich et al. .......... 705/26 |
| 6,199,079 | B1 | * | 3/2001 | Gupta et al. .............. 715/507 |
| 6,202,052 | B1 | * | 3/2001 | Miller .................... 705/31 |
| 6,643,624 | B2 | * | 11/2003 | Philippe et al. ........... 705/26 |
| 6,807,530 | B1 | * | 10/2004 | Shub et al. ............... 705/1 |
| 2005/0114218 | A1 | * | 5/2005 | Zucker et al. ............. 705/18 |

FOREIGN PATENT DOCUMENTS

| | | |
|---|---|---|
| EP | 0720090 A2 * | 7/1996 |
| EP | WO 96/38799 | 12/1996 |
| EP | 0855659 A1 | 1/1998 |
| EP | 0855687 A2 | 1/1998 |
| EP | WO 98/21679 | 5/1998 |
| EP | 0845747 A2 | 6/1998 |
| EP | 0883076 A2 | 12/1998 |
| EP | 0 902 381 A2 | 3/1999 |

OTHER PUBLICATIONS

Pereira P. Computer Reseller News n667 pp. 105,107 Jan. 22, 1996-"Live Wire: Enhanced Website Key Access Graphics Plan".*

McQuillan, J.M., "Nutshell Information Manager," Modern Office Technology, vol. 29, p. 111, Aug. 1984.*

Johannessen, V., et al., "Feedback," Data Based Advisor, vol. 8, No. 2, p. 10, Feb. 1990.*

Poulios, Nan "Tame the Tiger: Electronic Forms, Coupled with Workflow Management and Support for Client Computers, Can Increase Worker Productivity,"LAN magazine, vol. 7, No. 9, p. 77, Sep. 1992.*

Anon., "Kao Infosystems Launches T-Reg, Integrated Registration, for Customer Focused Marketing," PR Newswire, Oct. 17, 1996.*

Anon., "Industry Briefs: FDC Speeds Approval Process," Credit Risk Management Report, vol. 7, No. 7, Apr. 21, 1997.*

Anon., "3COM: 3com Annouces Winners of the First Annual Retail Network Innovation Awards," M2 Presswire, May 22, 1997.*

Hill, D., et al., "Internet Christmas Shoppers at Risk from Credit Card Fraud," Times of London, Features section, Oct. 19, 1997.*

Pack, Thomas, "All About Books OnLine," Online, Inc., vol. 20, No. 1, pp. 12-13, 16-21, Feb.-Mar. 1997.

Terdoslavich, William. "Java Electronic Commerce Framework." Computer Reseller News, Sep. 23, 1996, CMP Media, Inc., 1996, pp. 126, http://www.elibrary.com/getdoc.cgi?id=117852032x0y1781w4&OIDS=0Q001D002&Form=RL&pubname=Computer_Reseller_News&puburl=http~C~~S~~S~www.techweb.com&Querydocid=902269@library_d&dtype=0~0&dinst=0. [Accessed Nov. 19, 1998].

"Internet Access: Disc Distributing Announces Interactive World Wide." Cambridge Work-Group Computing Report, Cambridge Publishing, Inc., 1995, http://www.elibrary.com/getdoc.cgi?id=117852032x0y1781w4&OIDS=0Q003D019&Form=RL&pubname=Cambridge_Work-Group_Computing_Report&puburl= 0&querydocid=1007497@library_b&dtype=0~0&dinst=0. [Accessed Nov. 19, 1998].

Nance, Barry. "Reviews: A Grand Opening for Virtual Storefront With Middleware." Jun. 1, 1997, CMP Media, Inc. 1997, pp. 80, http://www.elibrary.com/getdoc.cgi?id=117852032x0y1781w4&OIDS=0Q005D005&Form=RL&pubname=Network_Computing&puburl=http~C~~S~~S~www.techweb.com&querydocid=1257247@library_a&dtype=0~0&dinst=0. [Accessed Nov. 19, 1998].

"Go-Cart Shopping Cart Software Features." 1996 GO International, Inc. http://www.go-cart.com/features.html. [Accessed Nov. 19, 1998].

"PerlShop Manual (version 2.2)." 1996, ARPAnet Corp. http://www.w3u.com/grokksoft/shop/perlman.html. [Accessed Nov. 19, 1998].

"Sax Sotfware Announces Sax NetSell; Sax NetSell's design-time ActiveX controls make Internet commerce easy." 1997, Sax Software Corp.

Jones, Chris. "Java Shopping Cart and Java Wallet; Oracels plans to join e-commerce initiative." Mar. 31, 1997. InfoWorld Media Group.

"Pacific Coast Software Software creates virtual shopping cart." Sep. 6, 1996. M2 Communications Ltd 1996.

"Software Creates Virtual Shopping Cart." Sep. 5, 1996. Business Wire, Inc.

Baron, Chris and Bob Weil, " Implementing a Web Shopping Cart," Dr. Dobb's Journal, Sep. 1996, pp. 64, 66, 68-69, and 83-85.

Hoque, Reaz, "A Shopping Cart Application with JavaScript," Web Techniques, May 1998, pp. 63, 65-66, and 68.

* cited by examiner

105
Thank you for your 1-Click order!

A quantity of 1 of [the item] will be shipped to you as soon as possible. We will do our best to minimize your shipping costs by combining your 1-Click orders into as few shipments a possible.

Please continue browsing.

Review or change your 1-Click orders

101 Summary description of item

*FIG. 1B*

Summary of 1-Click express orders

Press this button if you [changed quantities] of any item below. If you don't press it, your changes won't "stick." You can set the quantity to 0 (zero) to cancel an item.

The 1-Click order below (available in 3 or fewer days) will be shipped together.

106 {
Order# 098337

| 1 | Item 1 | $ 10.00 |
| 1 | Item 2 | $ 15.00 |
|   | Total  | $ 25.00 |

The 1-Click orders below (available in one week or more) will be shipped together.

107 {
Order# 098336

| 1 | Item 3 | $ 20.00 |
| 1 | Item 4 | $  6.00 |
|   | Total  | $ 26.00 |

108 {
Ship to: John Doe at home

Shipment method: Standard domestic shipping

Payment method: **__*1_2345

[continue shopping]

1-Click express shipping policies

*FIG. 1C*

START

A: Customer Name & Address

B: Customer Financial Info

C: Customer Employment Info

D: Customer Education Info

A: First Name :

M.I. :

Last Name :

Street :

City :

State : Zip :

[Next] [Previous]

B: Customer Financial Info

C: Customer Employment Info

D: Customer Education Info

A: Customer Name & Address

B: Net Worth: : [          ]

Annual Income: : [          ]

Spouse's Annual Income: : [          ]

Other Income: : [          ]

[ Next ]   [ Previous ]

C: Customer Employment Info

D: Customer Education Info

Create Group

Group Name: _____ 1001

Member Info

| Name | Email | Delivery Address | ... |
|---|---|---|---|
|  |  |  |  |
|  |  |  |  |
|  |  | ⋮ |  |
|  |  |  |  |
|  |  |  |  |

1002 points to the table.

*FIG. 10*

METHOD AND SYSTEM FOR PLACING A PURCHASE ORDER VIA A COMMUNICATIONS NETWORK

CROSS REFERENCE TO RELATED APPLICATIONS

This application is a continuation-in-part of U.S. patent Ser. No. 09/046,503, filed on Mar. 23, 1998 now abandoned and U.S. patent Ser. No. 08/928,951, filed on Sep. 12, 1997 now U.S. Pat. No. 5,960,411, and claims the benefit of International Application PCT/US98/18926 filed Sep. 10, 1998, all of which are incorporated by reference.

TECHNICAL FIELD

The present invention relates to a computer method and system for placing an order and, more particularly, to a method and system for ordering items over the Internet.

BACKGROUND OF THE INVENTION

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Many Web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

Since the purchaser-specific order information contains sensitive information (e.g., a credit card number), both vendors and purchasers want to ensure the security of such information. Security is a concern because information transmitted over the Internet may pass through various intermediate computer systems on its way to its final destination. The information could be intercepted by an unscrupulous person at an intermediate system. To help ensure the security of the sensitive information, various encryption techniques are used when transmitting such information between a client computer system and a server computer system.

Even though such encrypted information can be intercepted, because the information is encrypted, it is generally useless to the interceptor. Nevertheless, there is always a possibility that such sensitive information may be successfully decrypted by the interceptor. Therefore, it would be desirable to minimize the sensitive information transmitted when placing an order.

The selection of the various items from the electronic catalogs is generally based on the "shopping cart" model. When the purchaser selects an item from the electronic catalog, the server computer system metaphorically adds that item to a shopping cart. When the purchaser is done selecting items, then all the items in the shopping cart are "checked out" (i.e., ordered) when the purchaser provides billing and shipment information. In some models, when a purchaser selects any one item, then that item is "checked out" by automatically prompting the user for the billing and shipment information. Although the shopping cart model is very flexible and intuitive, it has a downside in that it requires many interactions by the purchaser. For example, the purchaser selects the various items from the electronic catalog, and then indicates that the selection is complete. The purchaser is then presented with an order Web page that prompts the purchaser for the purchaser-specific order information to complete the order. That Web page may be prefilled with information that was provided by the purchaser when placing another order. The information is then validated by the server computer system, and the order is completed. Such an ordering model can be problematic for a couple of reasons. If a purchaser is ordering only one item, then the overhead of confirming the various steps of the ordering process and waiting for, viewing, and updating the purchaser-specific order information can be much more than the overhead of selecting the item itself. This overhead makes the purchase of a single item cumbersome. Also, with such an ordering model, each time an order is placed sensitive information is transmitted over the Internet. Each time the sensitive information is transmitted over the Internet, it is susceptible to being intercepted and decrypted.

SUMMARY OF THE INVENTION

An embodiment of the present invention provides a method and system for ordering an item from a client system. The client system is provided with an identifier that identifies a customer. The client system displays information that identifies the item and displays an indication of an action (e.g., a single action such as clicking a mouse button) that a purchaser is to perform to order the identified item. In response to the indicated action being performed, the client system sends to a server system the provided identifier and a request to order the identified item. The server system uses the identifier to identify additional information needed to generate an order for the item and then generates the order.

The server system receives and stores the additional information for customers using various computer systems so that the server system can generate such orders. The server system stores the received additional information in association with an identifier of the customer and provides the identifier to the client system. When requested by the client system, the server system provides information describing the item to the requesting client system. When the server system receives a request from a client system, the server system combines the additional information stored in association with the identifier included in the request to effect the ordering of the item.

BRIEF DESCRIPTION OF THE DRAWINGS

FIGS. 1A–1C illustrate single-action ordering in one embodiment of the present invention.

FIGS. 8A–8C illustrate a hierarchical data entry mechanism in one embodiment.

FIG. 10 illustrates a grid for creation of a group and the entry of identifying information for recipients associated with the group (i.e., members).

DETAILED DESCRIPTION OF THE INVENTION

The present invention provides a method and system for single-action ordering of items in a client/server environment. The single-action ordering system of the present invention reduces the number of purchaser interactions needed to place an order and reduces the amount of sensitive information that is transmitted between a client system and a server system. In one embodiment, the server system assigns a unique client identifier to each client system. The server system also stores purchaser-specific order information for various potential purchasers. The purchaser-specific order information may have been collected from a previous order placed by the purchaser. The server system maps each client identifier to a purchaser that may use that client system to place an order. The server system may map the client identifiers to the purchaser who last placed an order using that client system. When a purchaser wants to place an order, the purchaser uses a client system to send the request for information describing the item to be ordered along with its client identifier. The server system determines whether the client identifier for that client system is mapped to a purchaser. If so mapped, the server system determines whether single-action ordering is enabled for that purchaser at that client system. If enabled, the server system sends the requested information (e.g., via a Web page) to the client computer system along with an indication of the single action to perform to place the order for the item. When single-action ordering is enabled, the purchaser need only perform a single action (e.g., click a mouse button) to order the item. When the purchaser performs that single action, the client system notifies the server system. The server system then completes the order by adding the purchaser-specific order information for the purchaser that is mapped to that client identifier to the item order information (e.g., product identifier and quantity). Thus, once the description of an item is displayed, the purchaser need only take a single action to place the order to purchase that item. Also, since the client identifier identifies purchaser-specific order information already stored at the server system, there is no need for such sensitive information to be transmitted via the Internet or other communications medium.

Figure 1A:
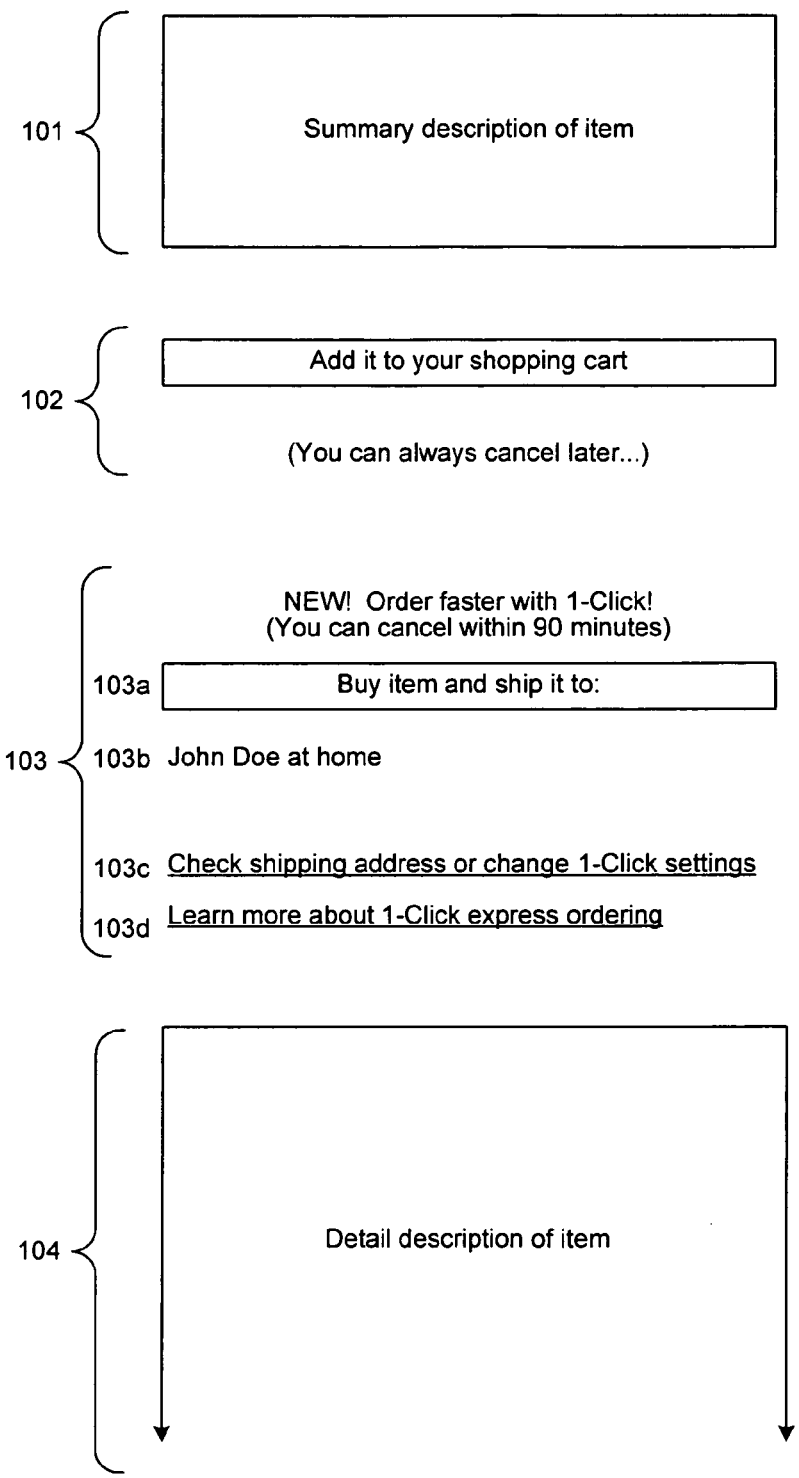

FIGS. 1A–1C illustrate single-action ordering in one embodiment of the present invention. FIG. 1A illustrates the display of a Web page describing an item that may be ordered. This example Web page was sent from the server system to the client system when the purchaser requested to review detailed information about the item. This example Web page contains a summary description section 101, a shopping cart section 102, a single-action ordering section 103, and a detailed description section 104. One skilled in the art would appreciate that these various sections can be omitted or rearranged or adapted in various ways. In general, the purchaser need only be aware of the item or items to be ordered by the single action and of the single action needed to place the order. The summary description and the detailed description sections provide information that identifies and describes the item(s) that may be ordered. The shopping cart section provides the conventional capability to add the described item to a shopping cart. The server system adds the summary description, the detailed description, and the shopping cart sections to each Web page for an item that may be ordered. The server system, however, only adds the single-action ordering section when single-action ordering is enabled for that purchaser at that client system. (One skilled in the art would appreciate that a single Web page on the server system may contain all these sections but the single-action ordering section can be selectively included or excluded before sending the Web page to the client system.) This example single-action ordering section allows the purchaser to specify with a single click of a mouse button to order the described item. Once the purchaser clicks the mouse button, the item is ordered, unless the purchaser then takes some action to modify the order. The single-action ordering section contains a single-action ordering button 103a, purchaser identification subsection 103b, and single-action ordering information subsections 103c and 103d. The purchaser information subsection displays enough information so that the purchaser can verify that the server system correctly recognizes the purchaser. To reduce the chances of sensitive information being intercepted, the server system sends only enough information so that the purchaser is confident that the server system correctly identified the purchaser but yet not enough information to be useful to an unscrupulous interceptor. The additional information subsections allow the purchaser to obtain various settings or obtain more information related to the single-action ordering. If the purchaser wants to verify the shipping address, the purchaser can select the "check shipping address" label. In response to this selection, the server system may require the purchaser to perform a "login" so that the identity of the purchaser can be verified before the shipping information is viewed or modified. The server system then sends a Web page to the client system for display and possible modification of the shipping address. In this way, the transmitting of the sensitive shipping address can be avoided unless requested by the verified purchaser.

When the purchaser selects the single-action ordering button, the client system sends a message to the server system requesting that the displayed item be ordered. After the server system processes the message, the server system provides to the client system a new Web page that confirms receipt of the single-action order. FIG. 1B illustrates the display of a Web page confirming a single-action order. The confirming Web page contains essentially the same information as the Web page describing the item (i.e., FIG. 1A) except that an order confirmation section 105 is displayed at the top of the Web page. The order confirmation section confirms that the order has been placed and provides an opportunity for the purchaser to review and change the single-action order. Alternatively, the confirming Web page can be identical to the Web page describing the item (i.e., FIG. 1A), except that the single-action ordering button is replaced with a message confirming the order.

If a single-action ordering is not currently enabled for the client system but could be enabled, then the server system can generate a Web page like FIG. 1A, except that the single-action ordering button 103a is replaced by a single-action ordering enable button. Such a replacement button could contain text instructing the purchaser to click on the button to enable single-action ordering. When the purchaser clicks on that button, the server system would send the Web page of FIG. 1A to be displayed. Single-action ordering can be enabled whenever the server system has stored sufficient purchaser-specific order information for that client system to complete a single-action order. If the server system does not have sufficient information, then when the purchaser selects the single-action ordering button, the server system can provide a Web page to collect the additional information that is needed. The server system may require the purchases to "login" so that the identify of the purchaser can be verified before the single-action ordering is enabled.

To help minimize shipping costs and purchaser confusion, the server system may combine various single-action orders into a multiple-item order. For example, if a purchaser orders one item using the single-action ordering and five minutes later orders another item using the single-action ordering, then those orders may be cost effectively combined into a single order for shipping. The server system combines the single-action orders when their expected ship dates are similar. For example, if one item is immediately available and the other item will be available in one day, then the two single-action orders may be cost-effectively combined. However, if the other item will not be available for two weeks, then the two single-item orders would not be combined. FIG. 1C illustrates the display of a Web page representing four single-action orders that have been combined into two separate multiple-item orders based on the availability of the items. The order information 106 indicates that item 1 and item 2, which will be available in three or fewer days, have been combined into one order. The order information 107 indicates that items 3 and 4, which will not be available within one week, are combined into a separate order. In one embodiment, the server system may combine single-action orders that are placed within a certain time period (e.g., 90 minutes). Also, the server system may combine or divide orders when the orders are scheduled for shipment based on the then current availability of the items ordered. This delayed modification of the orders is referred to as "expedited order selection" and is described below in detail.

Figure 2:
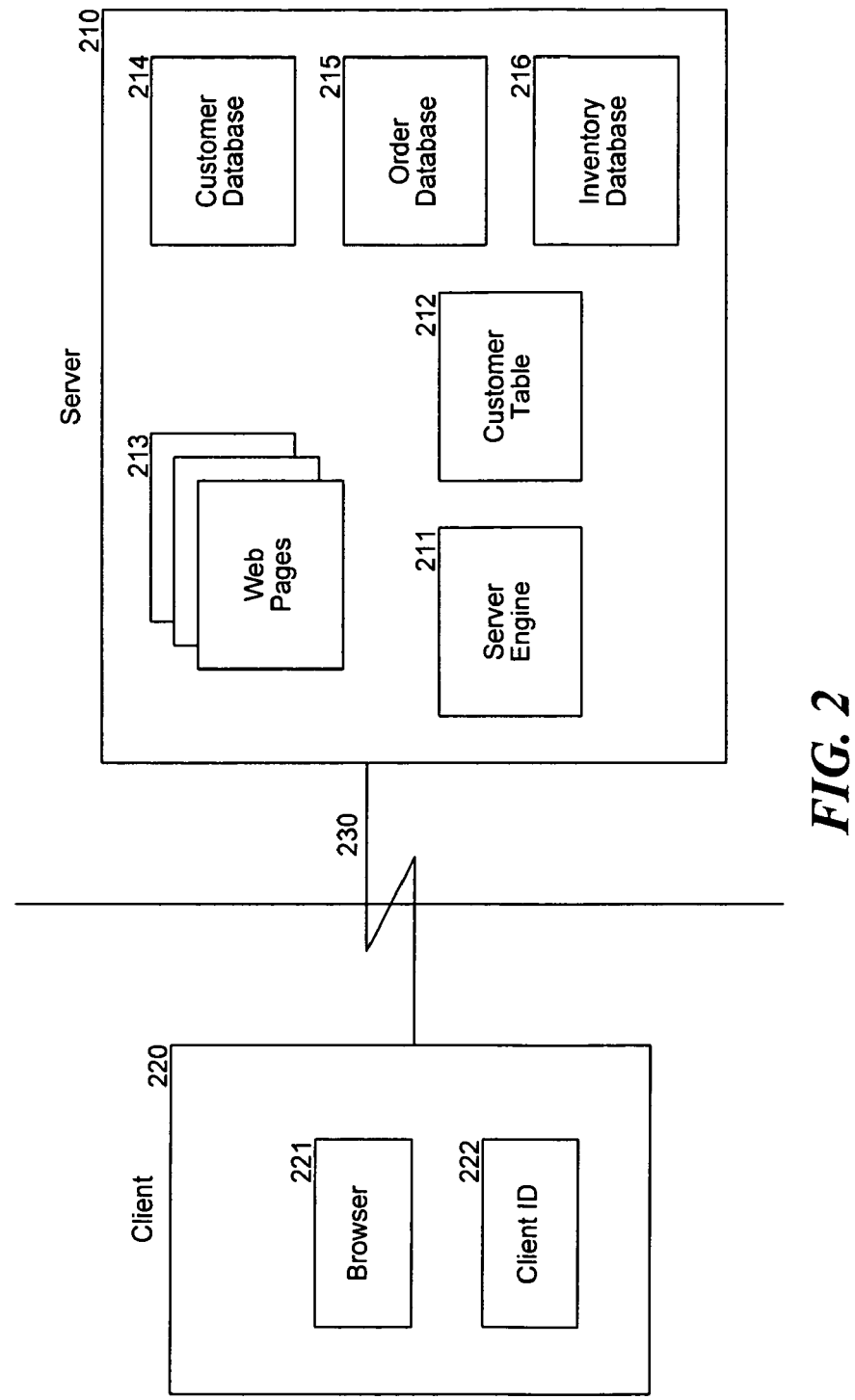
FIG. 2 is a block diagram illustrating an embodiment of the present invention.

FIG. 2 is a block diagram illustrating an embodiment of the present invention. This embodiment supports the single-action ordering over the Internet using the World Wide Web. The server system 210 includes a server engine 211, a client identifier/customer table 212, various Web pages 213, a customer database 214, an order database 215, and an inventory database 216. The server engine receives HTTP requests to access Web pages identified by URLs and provides the Web pages to the various client systems. Such an HTTP request may indicate that the purchaser has performed the single action to effect single-action ordering. The customer database contains customer information for various purchasers or potential purchasers. The customer information includes purchaser-specific order information such as the name of the customer, billing information, and shipping information. The order database 215 contains an entry for each order that has not yet been shipped to a purchaser. The inventory database 216 contains a description of the various items that may be ordered. The client identifier/customer table 212 contains a mapping from each client identifier, which is a globally unique identifier that uniquely identifies a client system, to the customer last associated with that client system. The client system 220 contains a browser and its assigned client identifier. The client identifier is stored in a file, referred to as a "cookie." In one embodiment, the server system assigns and sends the client identifier to the client system once when the client system first interacts with the server system. From then on, the client system includes its client identifier with all messages sent to the server system so that the server system can identify the source of the message. The server and client systems interact by exchanging information via communications link 230, which may include transmission over the Internet.

One skilled in the art would appreciate that the single-action ordering techniques can be used in various environments other than the Internet. For example, single-action ordering can also be in an electronic mail environment in which an item is described in an electronic mail message along with an indication of the single action that is to be performed to effect the ordering of the item. Also, various communication channels may be used such as local area network, wide area network, or point-to-point dial up connection. Also, a server system may comprise any combination of hardware or software that can generate orders in response to the single action being performed. A client system may comprise any combination of hardware or software that can interact with the server system. These systems may include television-based systems or various other consumer products through which orders may be placed.

Figure 3:
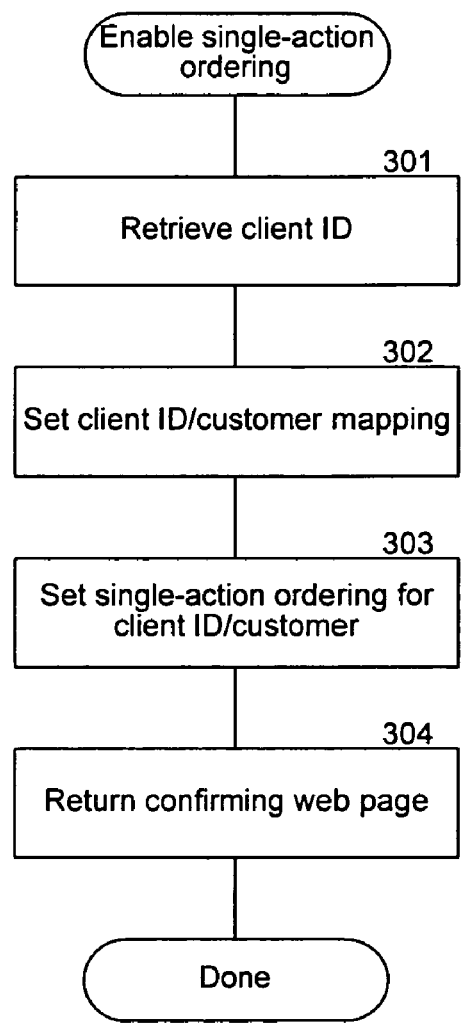
FIG. 3 is a flow diagram of a routine that enables single-action ordering for a customer.

FIG. 3 is a flow diagram of a routine that enables single-action ordering for a customer. To enable single-action ordering, a server system needs to have information about the customer that is equivalent to the purchaser-specific order information. The server system can obtain this information in various ways. First, the server system could ask the customer if they would like to have single-action ordering enabled. If so, then the server system could prompt the customer using a Web page for the purchaser-specific order information. Second, the server system could also save the purchaser-specific order information collected when an order is placed conventionally. The server system could, either automatically or with the customer's assent, enable single-action ordering. In step 301, the server system retrieves the client identifier that was sent by the client system. In step 302, the server system updates the client identifier/customer table to indicate that the generated client identifier has been associated with that customer. In step 303, the server system sets a flag indicating that single-action ordering is enabled for that client identifier and that customer combination. That flag may be stored in the client identifier/customer table. In step 304, the server system supplies a confirming Web page to the client system. The next time a purchaser attempts to order an item, the client system will supply its client identifier to the server system. If single-action ordering is enabled for that purchaser, the server system will assume that the purchaser is the customer associated with that client identifier in the client identifier/customer table. Thus, a purchaser may not want to allow the server system to enable single-action ordering if there is a possibility that someone else may use that same client system.

Figure 4:
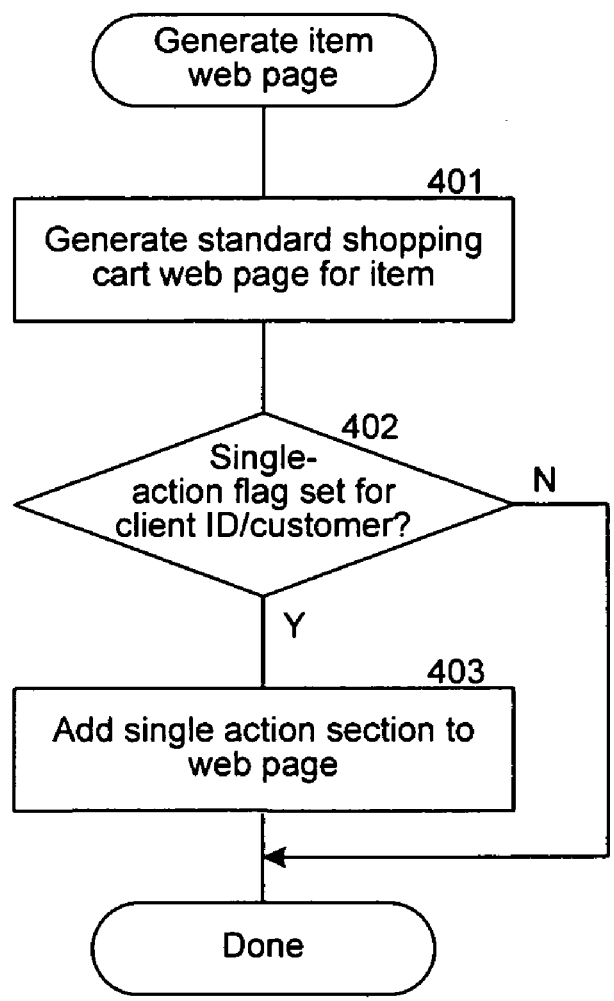
FIG. 4 is a flow diagram of a routine to generate a Web page in which single-action ordering is enabled.

FIG. 4 is a flow diagram of a routine to generate a Web page in which single-action ordering is enabled. When single-action ordering is enabled, the server system generates a Web page describing an item as is conventionally done and then adds a single-action ordering section. In one embodiment, the server system adds partial purchaser-specific order information to the section. This information may include the customer's name, a shipping address moniker selected by the purchaser (e.g., "at home"), and the last five digits of a credit card number or a nickname selected by the purchaser. Such partial information should be the minimum information sufficient to indicate to the purchaser whether or not the server system is using the correct purchaser-specific order information. In step 401, the server system generates a standard shopping cart-type Web page for the item. In step 402, if the single-action ordering flag has been set for the client identifier and customer combination, then the server system continues at step 403, else the server system completes. In step 403, the server system adds the single-action section to the Web page and completes.

Figure 5:
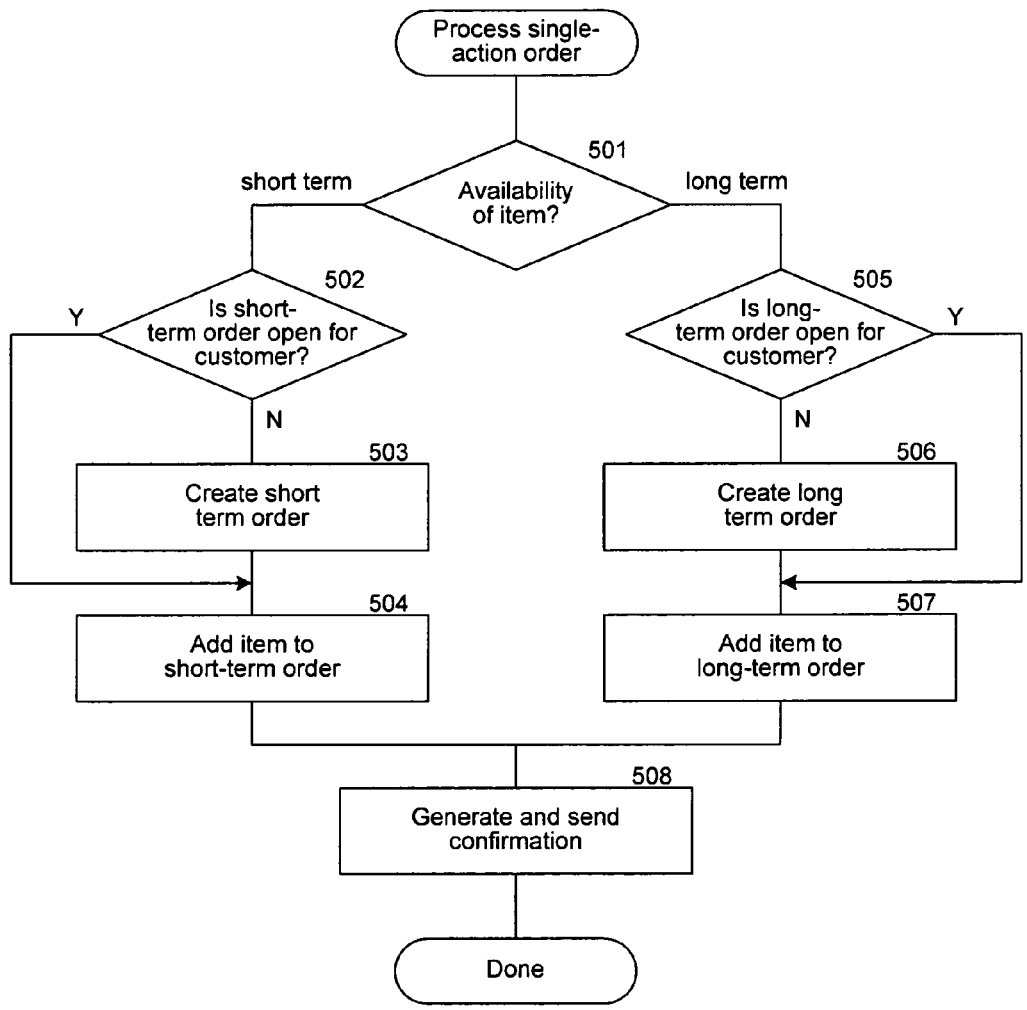
FIG. 5 is a flow diagram of a routine which processes a single-action order.

FIG. 5 is a flow diagram of a routine which processes a single-action order. When a purchaser performs the single action needed to place an order, the client system notifies the server system. The server system then combines the purchaser-specific order information for the customer associated with the client system with the item order information to complete the order. The single-action order may also be combined with other single-action orders and possibly with other conventionally placed orders to reduce shipping costs. In one embodiment, single-action orders can be combined if they are placed within a certain time period of each other (e.g., 90 minutes). This routine illustrates the combining of the single-action orders into a short-term order (e.g., available to be shipped in less than a week) and a long-term order (e.g., available to be shipped in more than a week). One skilled in the art would appreciate that the single-action orders can be combined in various ways based on other factors, such as size of shipment and intermediate-term availability. In step 501, if the item is expected to be shipped in the short term, then the server system continues at step 502, else the server system continues at step 505. In step 502, if a short-term order has already been opened for the purchaser, then the server system continues at step 504, else the server system continues at step 503. In step 503, the server system creates a short-term order for the purchaser. In step 504, the server system adds the item to the short-term order and continues at step 508. In step 505, if a long-term order has already been opened for the purchaser, then the server system continues at step 507, else the server system continues at step 506. In step 506, the server system creates a long-term order for the purchaser. In step 507, the server system adds the item to the long-term order. In step 508, the server system generates and sends the confirmation and completes.

Figure 6:
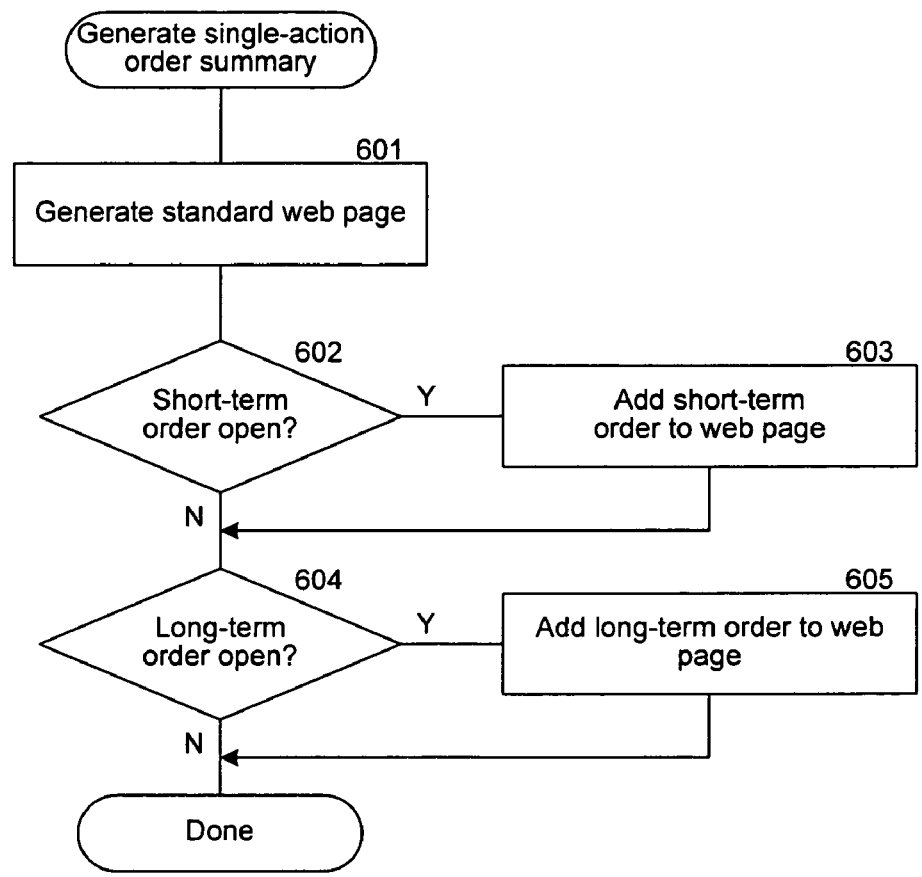
FIG. 6 is a flow diagram of a routine for generating a single-action order summary Web page.

FIG. 6 is a flow diagram of a routine for generating a single-action order summary Web page. This Web page (e.g., FIG. 1C) gives the user the opportunity to view and modify the short-term and long-term single-action orders. In step 601, the server system adds the standard single-action order information to the Web page. In step 602, if a short-term order is open, then the server system adds the short-term order to the Web page in step 603. In step 604, if a long-term order is open, then the server system adds the long-term order information to the Web page in step 605 and completes.

Figure 7:
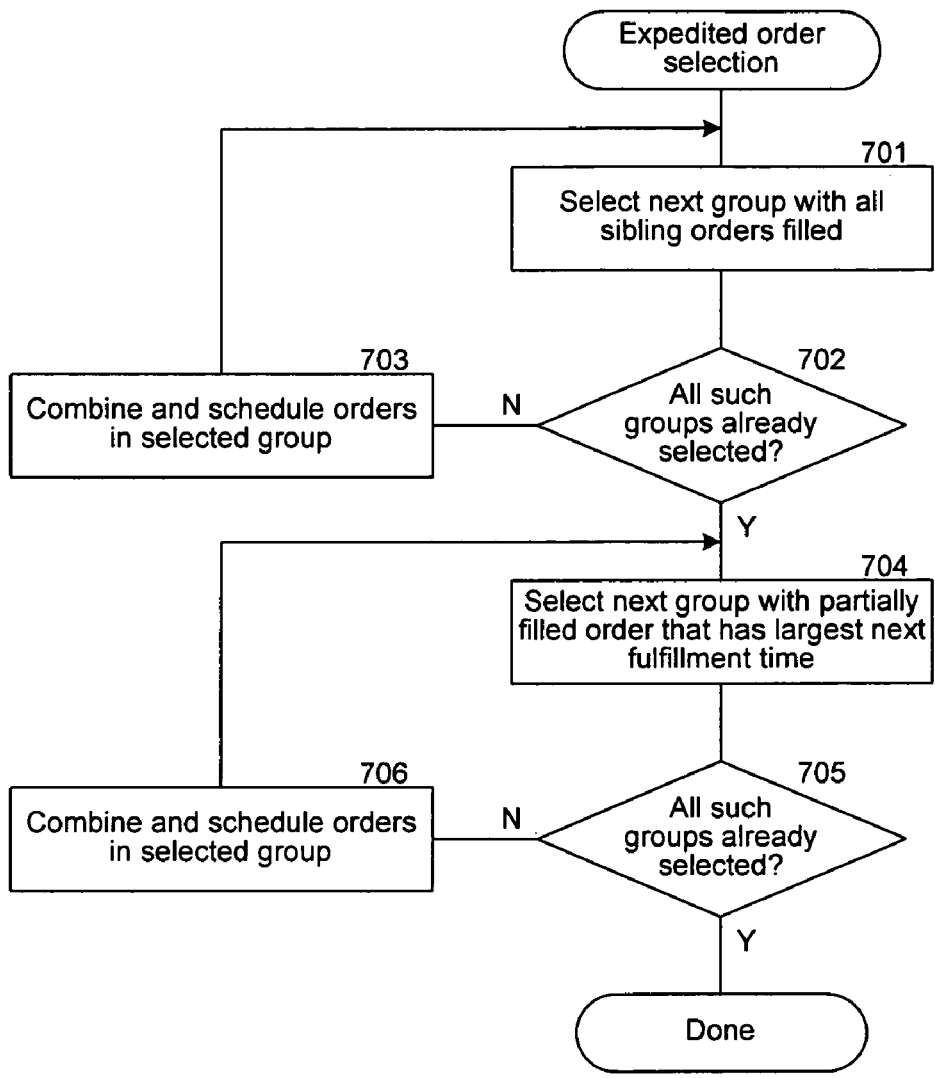
FIG. 7 is a flow diagram of a routine that implements an expedited order selection algorithm.

FIG. 7 is a flow diagram of a routine that implements an expedited order selection algorithm. The goal of the expedited order selection algorithm is to minimize the number of orders sent to each destination so that shipping costs are reduced. A destination may be a specific shipping address plus a specific purchaser's billing details. Orders that are sent to the same destination are known as "sibling orders." The algorithm has two stages. In the first stage, the algorithm schedules for shipment the orders for destinations for which all the sibling orders are filled. An order is filled when all its items are currently in inventory (i.e., available) and can be shipped. For each group of sibling orders, the algorithm combines those sibling orders into a single combined order so that only one order is currently scheduled for shipment to each destination. In the second stage, the algorithm combines and schedules groups of sibling orders for which some of the sibling orders are not filled or partially filled. The algorithm may split each partially filled sibling order into a filled sibling order and a completely unfilled sibling order. The algorithm then combines all the filled sibling orders into a single combined order and schedules the combined order for shipment. If any group has only one sibling order and that order is partially filled, then the algorithm in one embodiment does not split that order to avoid making an extra shipment to that destination.

During the second stage, the algorithm may select and schedule groups of sibling orders in a sequence that is based on the next fulfillment time for an item in the group. The next fulfillment time for a group of sibling orders is the minimum expected fulfillment time of the items in that group of sibling orders. For example, if a group of sibling orders has seven items that are not yet fulfilled and their expected fulfillment times range from 3 days to 14 days, then the next fulfillment time for that group is 3 days. The algorithm first schedules those groups of sibling orders with the largest next fulfillment time. For example, if 6 groups have next fulfillment times of 3, 5, 7, 10, 11, and 14 days, respectively, then the algorithm first selects and schedules the sibling orders in the group with the next fulfillment time of 14 days, followed by the group with the next fulfillment time of 11 days, and so on. By delaying the scheduling of groups with short next fulfillment times, the algorithm increases the chances of additional items becoming available (because of the shortness of the next fulfillment time) and thus combined with the scheduled order.

Steps 701–703 represent the first stage of the expedited order selection algorithm, and steps 704–706 represent the second stage of the expedited selection order algorithm. In steps 701–703, the algorithm loops selecting groups in which all sibling orders are filled and combining the orders. In step 701, the algorithm selects the next group with all sibling orders that are filled. In step 703, if all such groups have already been selected, then the algorithm continues with the second stage in step 704, else the algorithm continues at step 703. In step 703, the algorithm combines and schedules the orders in the selected group and loops to step 701. In step 704, the algorithm selects the next group of sibling orders that has the largest next fulfillment time. In step 705, if all such groups have already been selected, then the algorithm is done, else the algorithm continues at step 706. In step 706, the algorithm combines and schedules the orders in the selected group and loops to step 704. When the expedited order selection algorithm is being performed, new orders and new inventory may be received. Whenever such new orders and new inventory is received, then the algorithm restarts to schedule and combine the new orders as appropriate.

Although the algorithm has been described as having two stages, it could be implemented in an incremental fashion where the assessment of the first and second stages are redone after each order is scheduled. One skilled in the art would recognize that there are other possible combinations of these stages which still express the same essential algorithm.

FIGS. 8A–8C illustrate a hierarchical data entry mechanism in one embodiment. When collecting information from a user, a Web page typically consists of a long series of data entry fields that may not all fit onto the display at the same time. Thus, a user needs to scroll through the Web page to enter the information. When the data entry fields do not fit onto the display at the same time, it is difficult for the user to get an overall understanding of the type and organization of the data to be entered. The hierarchical data entry mechanism allows a user to understand the overall organization of the data to be entered even though the all data entry fields would not fit onto the display at the same time. FIG. 8A illustrates an outline format of a sample form to be filled in. The sample form contains various sections identified by letters A, B, C, and D. When the user selects the start button, then section A expands to include the data entry fields for the customer name and address. FIG. 8B illustrates the expansion of section A. Since only section A has been expanded, the user can view the data entry fields of section A and summary information of the other sections at the same time. The user then enters data in the various data entry fields that are displayed. Upon completion, the user selects either the next or previous buttons. The next button causes section A to be collapsed and section B to be expanded so that financial information may be entered. FIG. 8C illustrates the expansion of section B. If the previous button is selected, then section A would collapse and be displayed as shown in FIG. 8A. This collapsing and expanding is repeated for each section. At any time during the data entry, if an error is detected, then a Web page is generated with the error message in close proximity (e.g., on the line below) to the data entry field that contains the error. This Web page is then displayed by the client system to inform the user of the error. In addition, each of the data "entry" fields may not be editable until the user clicks on the data entry field or selects an edit button associated with the data entry field. In this way, the user is prevented from inadvertently changing the contents of an edit field. When the user clicks on a data entry field, a new Web page is presented to the user that allows for the editing of the data associated with the field. When editing is complete, the edited data is displayed in the data "entry" field. Because the fields of the form are thus not directly editable, neither "named-submit" buttons nor Java are needed. Also, the form is more compact because the various data entry options (e.g., radio button) are displayed only on the new Web page when the field is to be edited.

In other embodiments, the present invention provides a mechanism for giving a gift to an identified recipient(s) using a single action. When information is displayed describing the item, the system displays an instruction to identify the recipient(s) and then to select a "give" button to effect the giving of the item to the identified recipient(s). If the user is giving the gift to only one recipient, then the user enters identifying information, such as the email address, of the recipient. If the user is giving the gift to more than one recipient, the user could enter the identifying information of each recipient, or alternatively, the user could enter a group name that is associated with the identifying information for each member (i.e., recipient) of the group. The system uses the identifying information to identify a delivery address for the gift. As described in more detail below, the system can use various databases to locate information for an identified recipient.

Figure 9A:
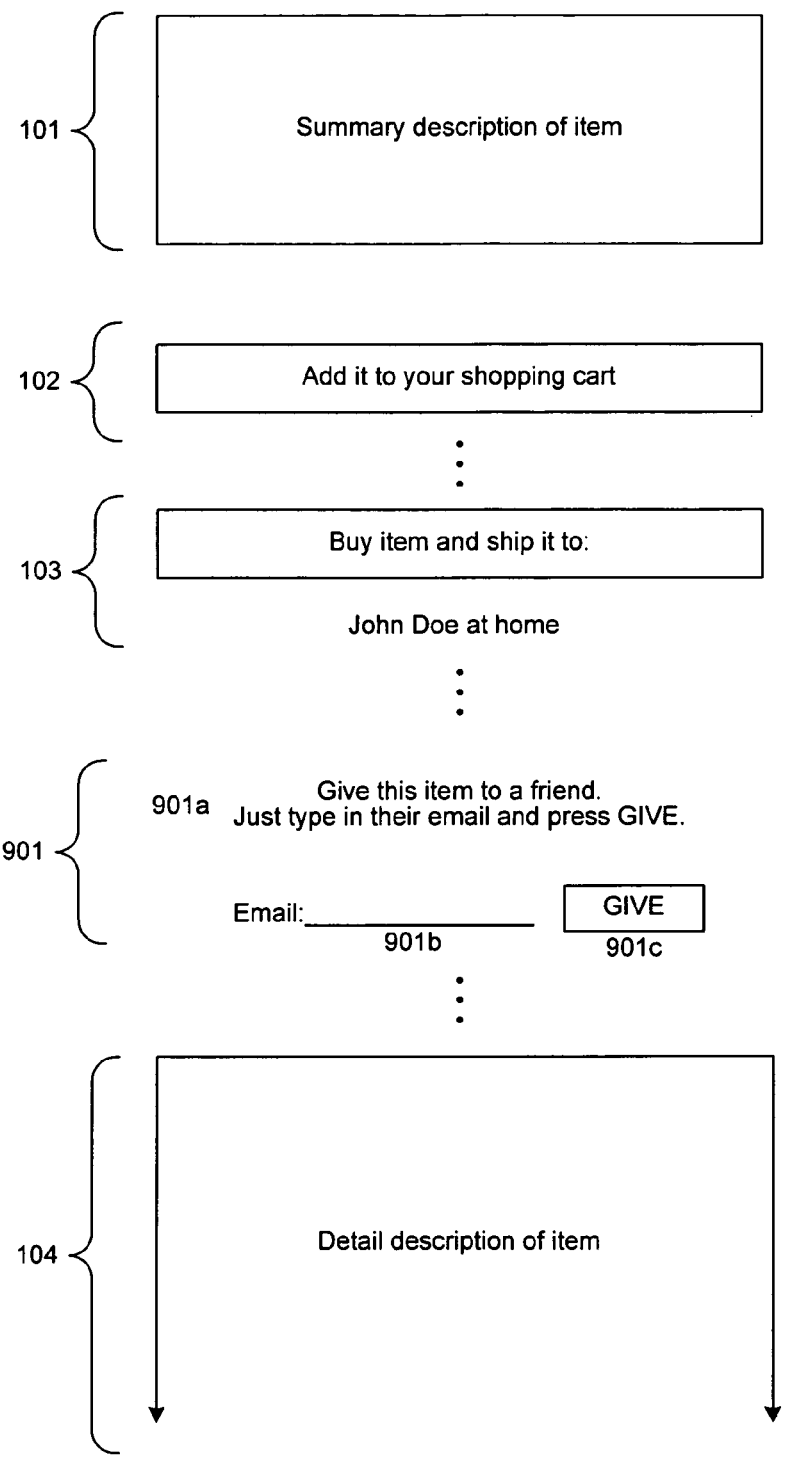
FIGS. 9A–9B illustrate use of a single-action to give an item as a gift to one or more recipients.
Figure 9B:
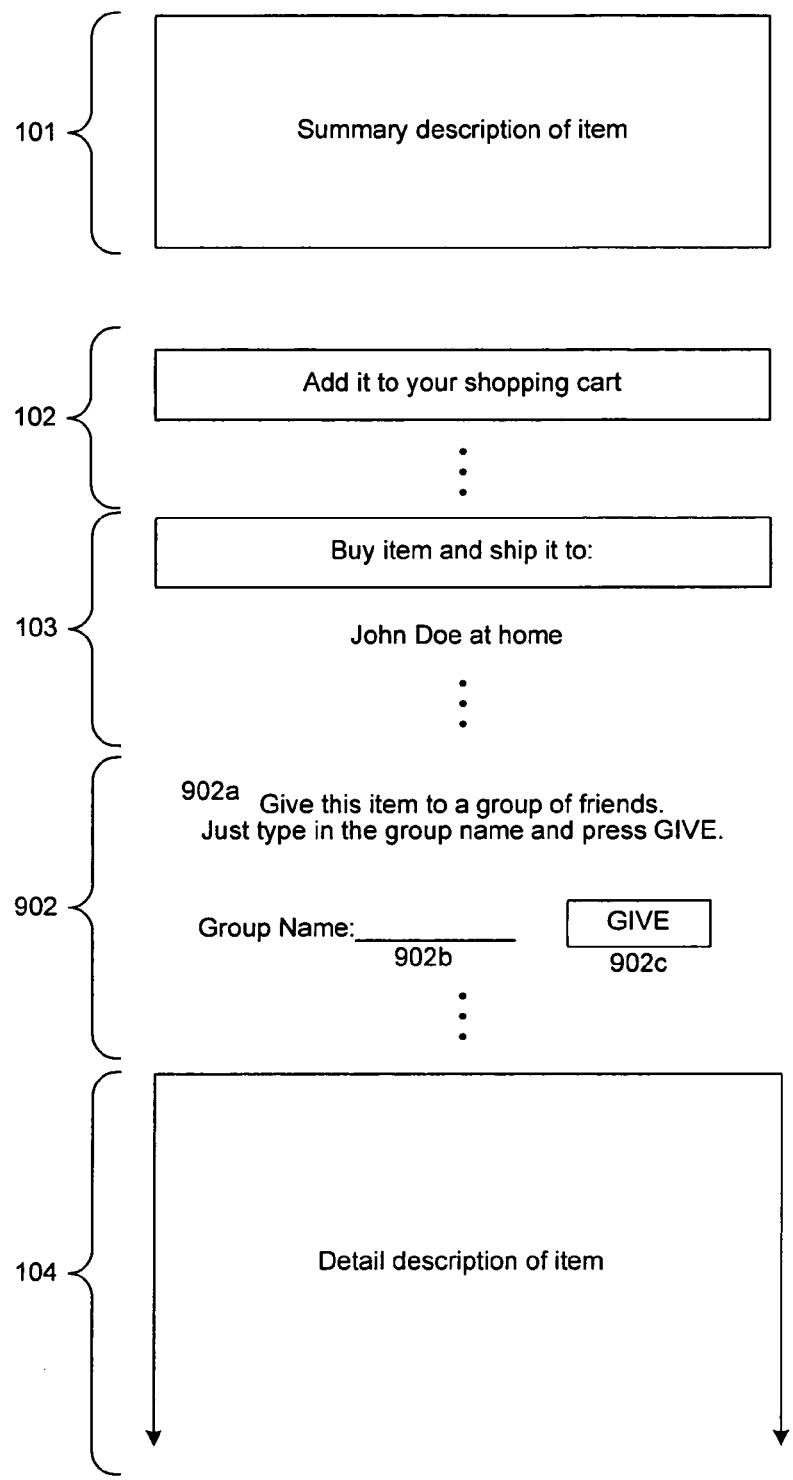

FIGS. 9A–9B illustrate use of a single-action to give an item as a gift to one or more recipients. FIG. 9A illustrates the giving of a gift to one recipient. The sections 101–104 are the same as described for FIG. 1A. The gift giving section 901 contains an instruction subsection 901a, an identifying information subsection 901b, and a single-action giving subsection 901c. To effect the giving of the item to a recipient, the user enters the email address of the recipient in the identifying information subsection 902b and then selects the single-action giving subsection 901c. The system receives the email address and uses the email address to locate the delivery address for the recipient as described below in detail. The system bills the item to the user based on information stored for that user for single-action ordering and ships the item to the recipient at the delivery address. As described below, the system can allow many different types of identifying information to be specified by the user.

FIG. 9B illustrates the giving of a gift to multiple recipients. The gift giving section 902 contains an instruction subsection 902a, a group name subsection 902b, and a single-action giving subsection 902c. To effect the giving of the item to multiple recipients, the user inputs a name of the group that identifies the recipients into the group name subsection 902*b* and then selects the single-action giving subsection 902*c*. The system uses the group name to identify a list of recipients who are associated with the group name. FIG. 10 illustrates a grid for creation of a group and the entry of identifying information for recipients associated with the group (i.e., members). The user enters the group name in group name section 1001 and then enters information relating to the recipients in each row of the member information section 1002. The user can enter as much information about each recipient associated with the group as is known by the user. For example, the user may enter only the email address for some users, while entering the name, email address, and delivery address of other recipients. When the system is requested to give an item to each recipient associated with a group, the system uses the information stored for each recipient to identify additional information need to effect the delivery of the gift as described below. The system may also store the identified additional information for each recipient so that when another item is subsequently given to that recipient, the additional information needed to effect the delivery of the item can be quickly retrieved. Alternatively, a single address book for a user containing the information for all possible recipients can be maintained. The user specifies a group by indicating some of the recipients whose addresses are in the address book. The use of address books facilitates, the maintaining of multiple groups that have one or more recipients in common. In addition, a user can at any time provide additional information about a recipient to facilitate the retrieval of sufficient information to effect the delivery of an item.

A computer-based method and system for coordinating the delivery of gifts by receiving gift orders, collecting additional delivery information that is not specified in the gift orders, and delivering gifts based on the additional delivery information is also provided. In one embodiment, the gift delivery system of the present invention receives gift orders via Web pages provided on the WWW. The gift orders specify a gift that is to be delivered to a recipient. The recipient may be identified by information that does not include the delivery address of the recipient. For example, the recipient may be only identified by a name and contact information such as an electronic mail address or a telephone number. The gift delivery system attempts to contact the recipient to obtain sufficient delivery information. If the contact is not successful, the gift delivery system searches various databases of information to identify additional contact information. If sufficient delivery information is obtained, the gift is delivered to the recipient and the gift giver is notified accordingly. If, however, sufficient delivery information cannot be obtained, the gift giver is notified that the gift cannot be delivered.

Figure 11:
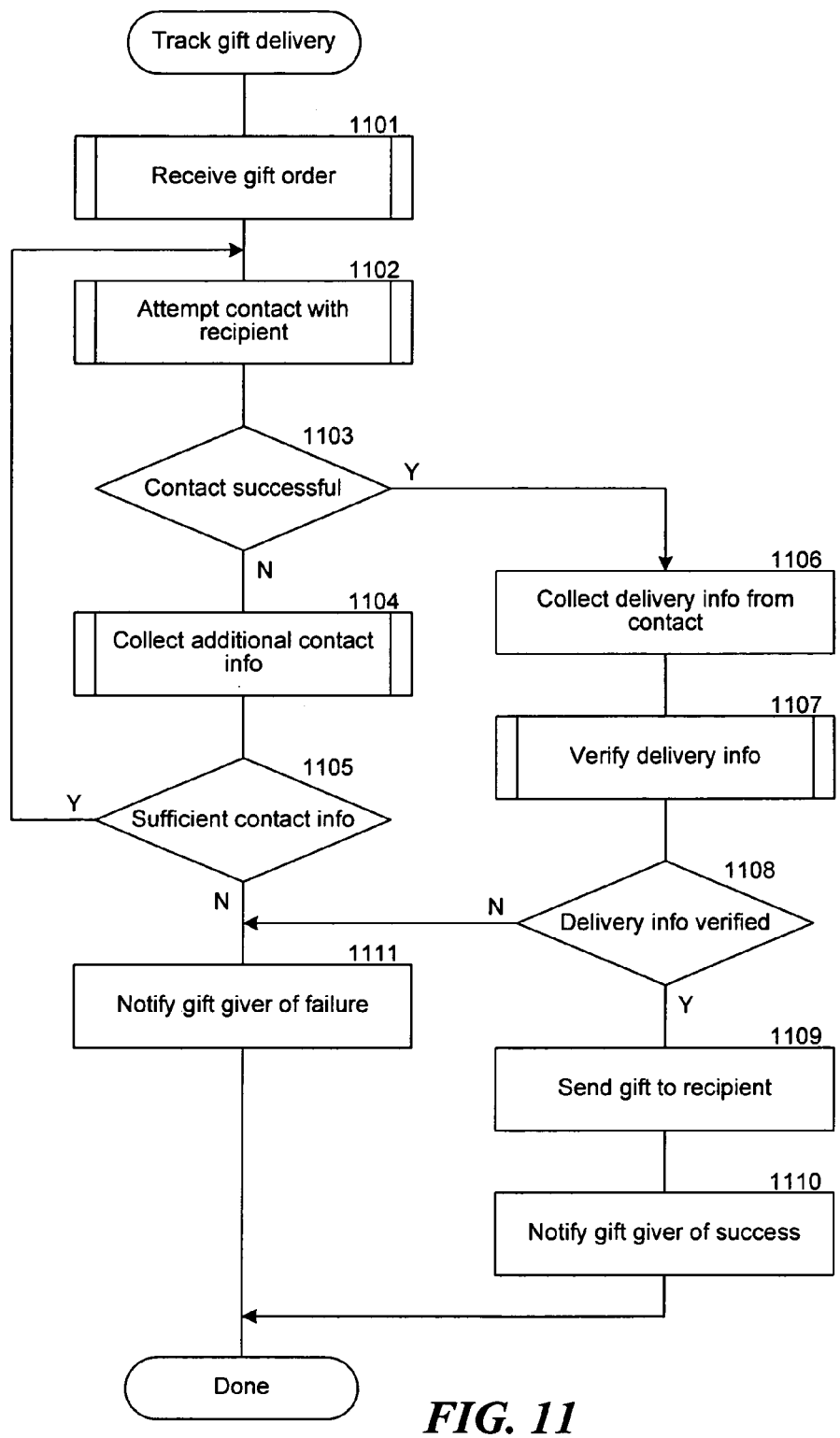
FIG. 11 is a flow diagram of the overall flow of the gift delivery system.

FIG. 11 is a flow diagram of the overall flow of the gift delivery system. In step 1101, the gift delivery system receives the order for a gift from a gift giver. In one embodiment, the order is received via access through a Web page, but may also be received via other modes of communication, such as a voice telephone call, postal mail, facsimile, or electronic mail. In step 1102, the gift delivery system attempts to contact the recipient of the gift. The gift order may specify contact information for the recipient, such as an electronic mail address or a telephone number of the recipient. Based on the contact information provided with the gift order, an attempt via electronic mail or an automated voice telephone call is made to initially contact the recipient and gather sufficient delivery information. Alternatively, a person may attempt to make a voice telephone contact with the recipient. In step 1103, if the initial contact is successful, then the system continues at step 1106, else the system continues at step 1104. In step 1104, the system attempts to collect additional contact information. The system can obtain the additional contact information through various database sources using the information provided with the gift order. For example, the system can use the recipient's name or the recipient's electronic mail address to access Internet-based database systems. In step 1105, if the system obtains additional contact information from these additional sources, then the system loops to step 1102 to attempt to contact the recipient using the additional contact information, else the system continues at step 1111. In step 1106, the system collects delivery information from the successful contact. For example, if the successful contact is a phone call, the operator making the phone call preferably enters the delivery information. If the successful contact is an electronic mail exchange, the system preferably parses the recipient's reply message to collect the delivery information. In step 1107, the system verifies that the delivery information is correct. The system may use various databases, which contain lists of all proper street addresses, to verify the address. In step 1108, if the delivery information is verified, then the system continues at step 1109 to send the gift to the recipient, else the system continues at step 1111. In step 1109, the system sends the gift to the recipient. In step 1110, the system sends an electronic mail to the gift giver providing notification that the gift has been sent successfully. In step 1111, if sufficient delivery information could not be gathered or the delivery information could not be verified, then the system sends a message (e.g., via electronic mail) to the gift giver providing notification that the gift could not be delivered and is being placed on hold.

In an additional embodiment (not shown), if an attempt to contact the recipient is unsuccessful in step 1103, then the system attempts to obtain additional delivery information for the recipient from sources other than the recipient, such as databases and other sources similar to those discussed below in conjunction with FIG. 8. If the system is able to obtain sufficient delivery information for the recipient in this manner, the system preferably sends the gift to the recipient using the obtained delivery information.

Figure 12:
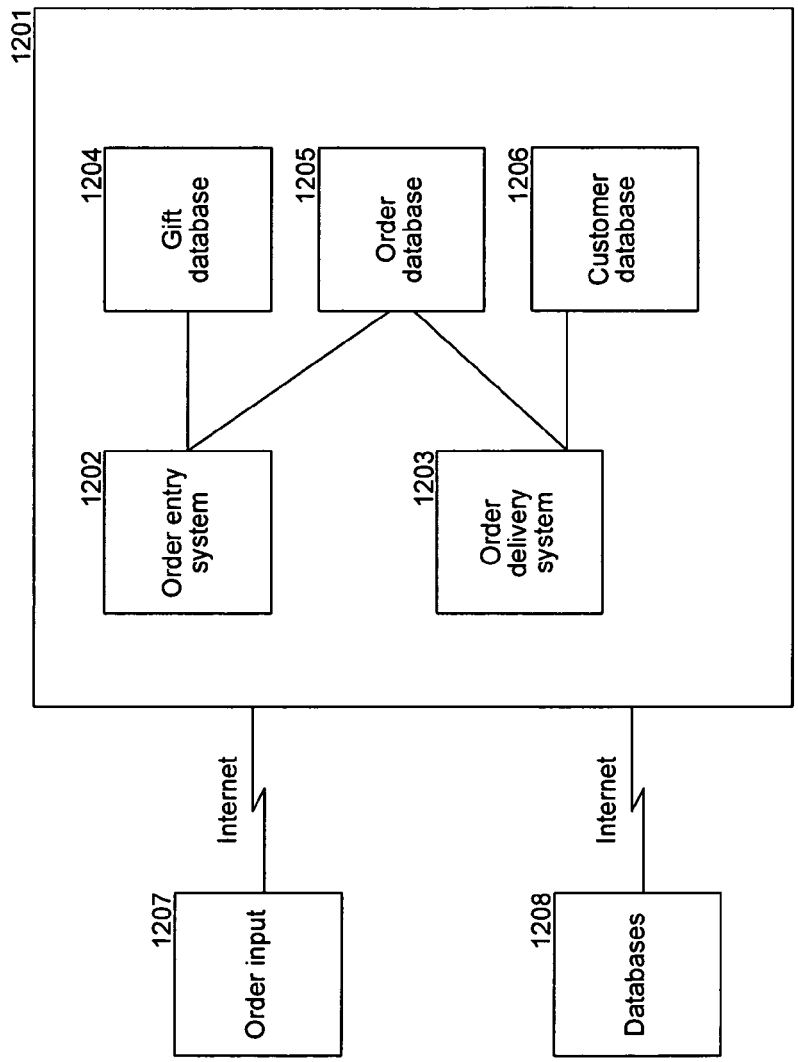
FIG. 12 is a block diagram illustrating the components of the gift delivery system.

FIG. 12 is a block diagram illustrating the components of the gift delivery system. Computer system 1201 contains a central processing unit, memory, and peripheral devices, such as a disk drive and CD-ROM. The gift delivery system includes an order entry system 1202 and an order delivery system 1203. The order entry system provides a user interface for a gift giver to input a gift order. The order entry system in one embodiment comprises a Web page that accesses a gift database 1204. The gift giver uses the Web page provided to select which gift should be sent to the recipient. In addition, the gift giver provides information describing the recipient. The order entry system then stores the order information in the order database 1205. The gift delivery system controls the locating of additional delivery information so that the gift can be successfully delivered to the recipient. The gift delivery system retrieves information from the order database and attempts to contact the recipient based on the information provided with the gift order. If the recipient cannot be contacted based on that information, then the gift delivery system accesses other database sources, such as the customer database 1206 and Internet-based databases 1208 to gather additional contact information for the recipient.

Figure 13:
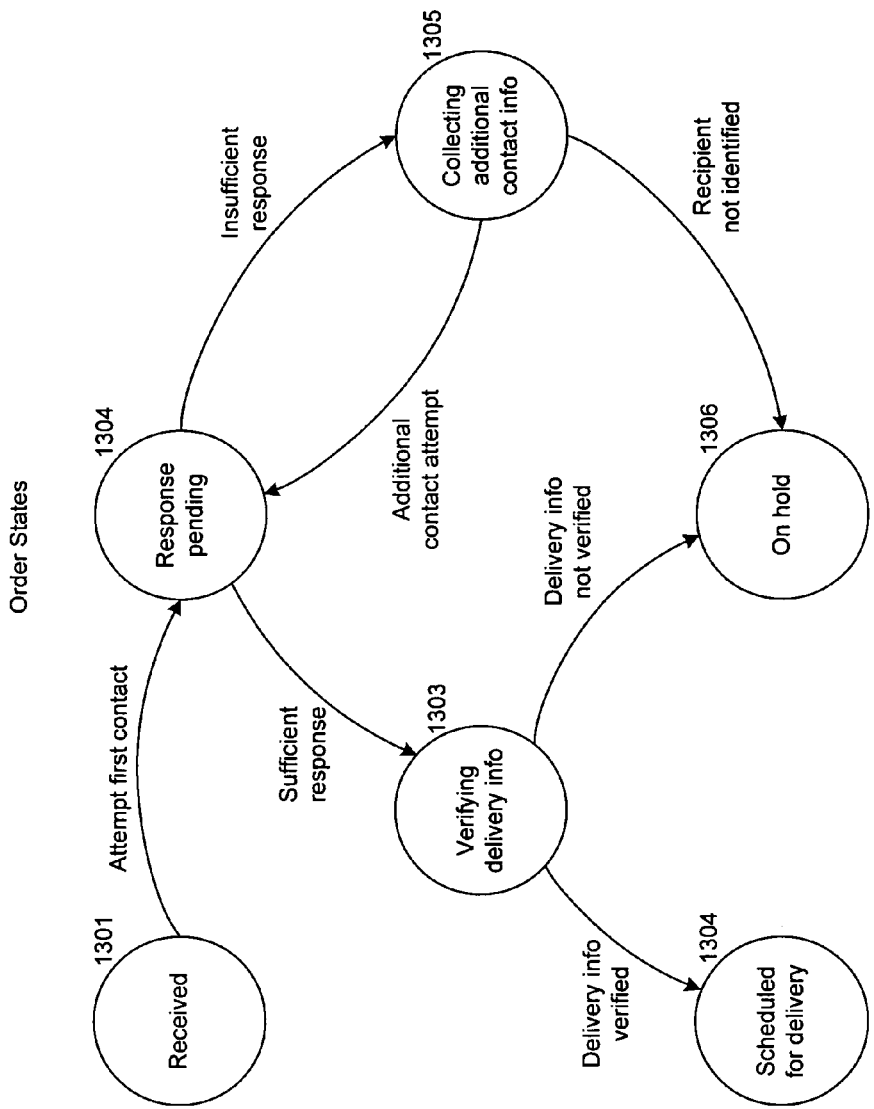
FIG. 13 is a state diagram illustrating the various states of a gift order.

FIG. 13 is a state diagram illustrating the various states of a gift order. A gift order can be in one of six states: received, response pending, verifying delivery information, collecting additional contact information, on hold, and scheduled for delivery. Initially, when an order is received, the system places the order in the received state 1301. When the system attempts to contact the recipient using the information provided by the gift giver, the gift order changes to a response pending state 1302. The response pending state indicates that the attempt to contact is in progress, but no response has yet been received from the recipient. If a sufficient response is received from the recipient in the allotted time (e.g., 24 hours), then the gift order changes to the verifying delivery information state 1303. In the verifying delivery information state, the system attempts to verify that the delivery information is correct. If the delivery address is correct, then the gift order enters the scheduled for delivery state 1304. If the initial response was insufficient or not received in the allotted time, then the system places the gift order in the collecting additional contact information state 1305. In the collecting additional contact information state, the system searches additional sources of information to determine additional contact information about the recipient. If additional contact information can be found, then the system attempts an additional contact, and places the gift order in the response pending state 1302. If, however, additional contact information cannot be found, then the system places the gift order in the on hold state 1306.

In a further preferred embodiment, if the initial response is insufficient, then the system places the gift order in a collecting additional delivery information state (not shown). In the collecting additional delivery information state, the system searches additional sources of information to obtain additional delivery information for the recipient. If the system is able to obtain sufficient delivery information in this manner, then the system places the gift order in the verify delivery information state 1303. Otherwise, the system places the gift order in the on hold state 1306.

Figure 14:
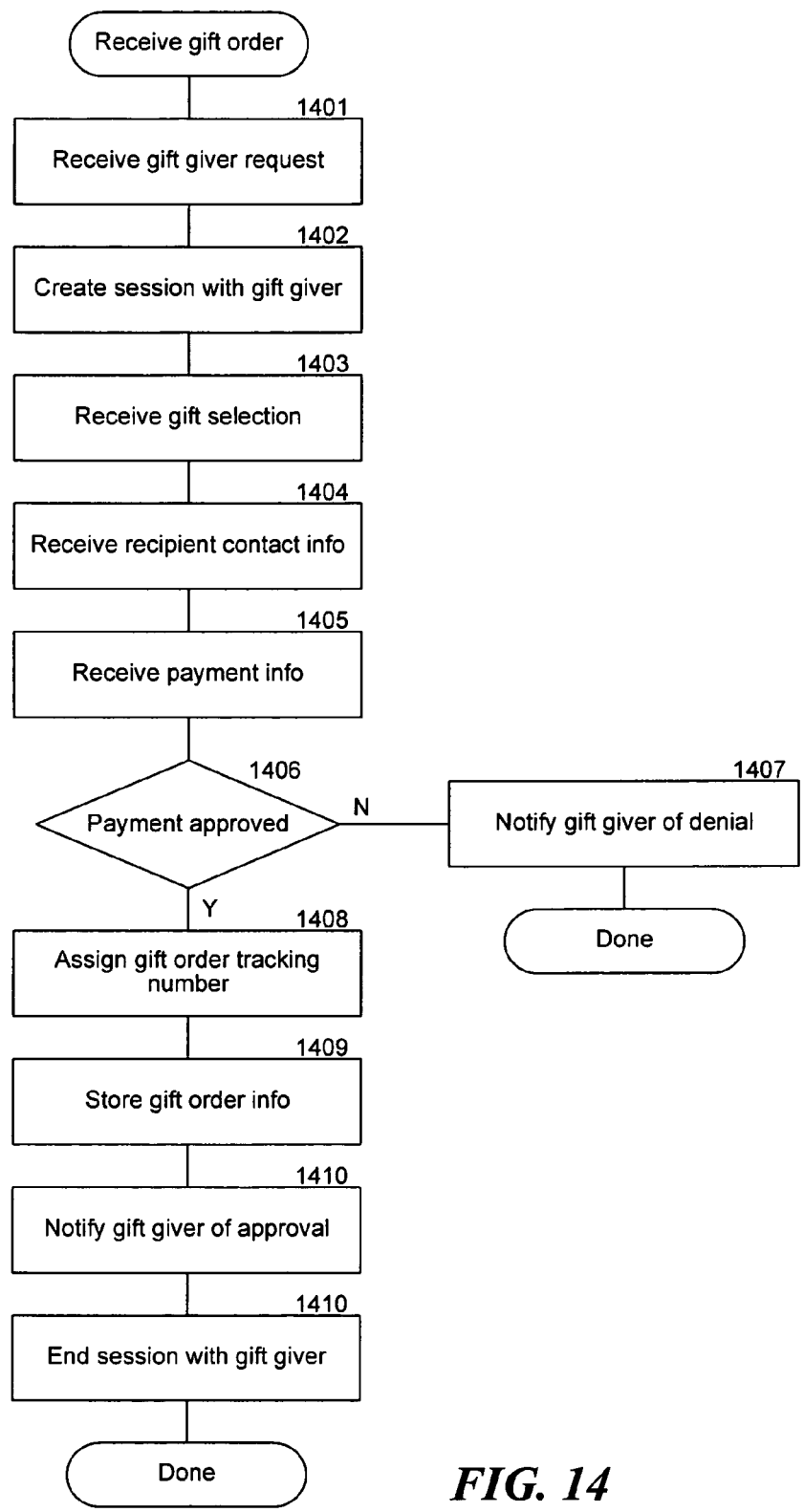
FIG. 14 is a flow diagram of a routine that controls the receiving of gift orders.

FIG. 14 is a flow diagram of a routine that controls the receiving of gift orders. The receive gift order routine controls the interaction with the gift giver to select a gift from the gift database, to receive information on the recipient, to receive the payment, and to store the gift order in a database. This routine processes gift orders received electronically. One skilled in the art would appreciate that similar routines could be developed to handle other forms of receiving gift orders. In step 1401, the routine receives a request to send a gift from a gift giver to a recipient electronically via a Web page. In step 1402, the routine creates a session with the gift giver. The session is used to track the interaction with the gift giver and the gift delivery system. In step 1403, the routine receives the gift selection information. The gift selection information may be selected in response to a display of available gifts from the gift database. In step 1404, the routine receives recipient contact information from the gift giver. The recipient contact information may typically include the recipient's name and electronic mail address. In step 1405, the routine receives payment information. The payment information may be in an electronic form, such as a credit card, debit card, or digital cash, or in a conventional form, such as check or money order. If in conventional form, the gift order may be placed in an additional state waiting for receipt of the payment. In step 1406, if the payment is approved, then the routine continues at step 1408, else the routine notifies the gift giver that the payment has been denied. In step 1408, the routine assigns a gift order tracking number to the gift order. The gift order tracking number is used by the system to identify the gift order throughout its processing. In step 1409, the routine stores the gift order information in the gift order database. In step 1410, the routine notifies the gift giver that the gift order has been accepted. In step 1411, the routine ends the session with the gift giver.

Figure 15:
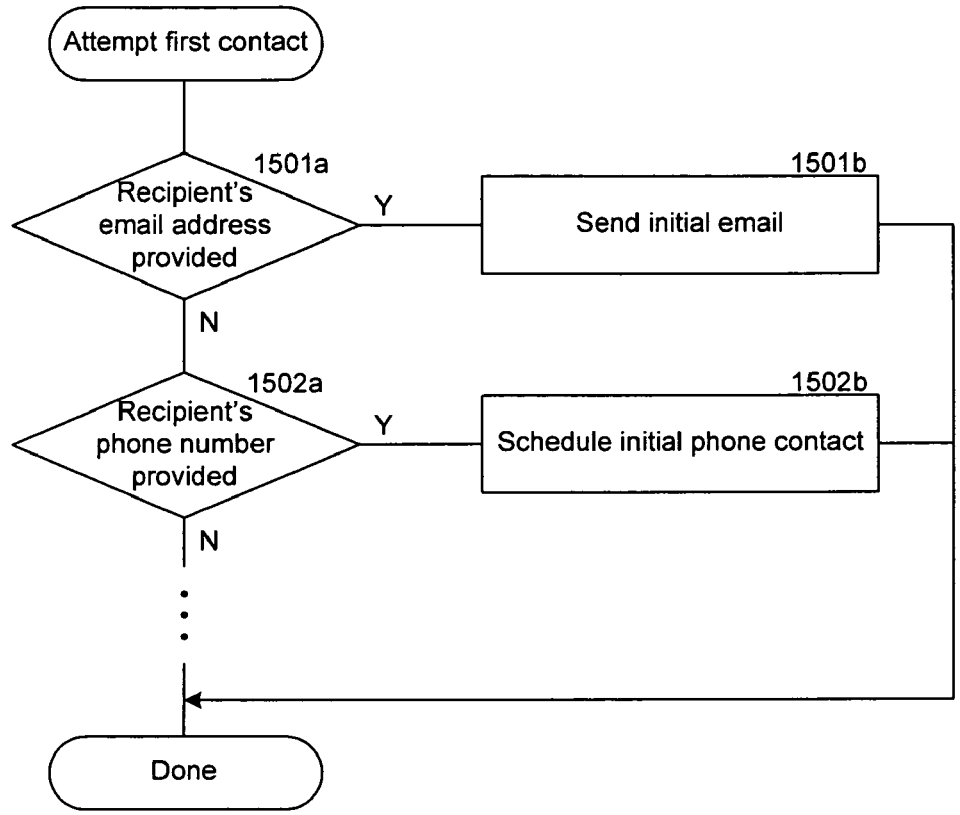
FIG. 15 is a block diagram of a routine that controls the attempt at first contact of the recipient.

FIG. 15 is a block diagram of a routine that controls the attempt at first contact of the recipient. The first contact is made with contact information provided by the gift giver, such as electronic mail address and telephone number. If sufficient information is not provided to even attempt to contact the recipient initially, the gift delivery system searches various databases to obtain such information based on the recipient's name. In step 1501*a*, if the recipient's electronic mail address has been provided in the gift order, then the routine continues at step 1501*b*, else the routine continues at step 1502*a*. In step 1501*b*, the routine sends an electronic mail to the electronic mail address provided. The electronic mail contains information indicating that a gift is to be sent to the recipient and requests delivery information for the gift. The electronic mail includes the tracking number assigned by the system so that when a reply mail is received, the gift delivery system can determined to which gift order it corresponds. In step 1502*a*, if the recipient's phone number has been provided, then the routine continues at 1502*b*, else the routine continues various other attempts to contact the recipient. For example, if a facsimile number was provided, a facsimile message is sent to the number. In step 1502*b*, the routine schedules an initial telephone contact with the recipient. The initial telephone contact could be via an automated voice telephone system in which a message is left with the person answering the phone or with an answering machine. Alternatively, a human operator may make the initial voice contact. After the initial contact is made, the gift order is placed in response pending state.

Figure 16:
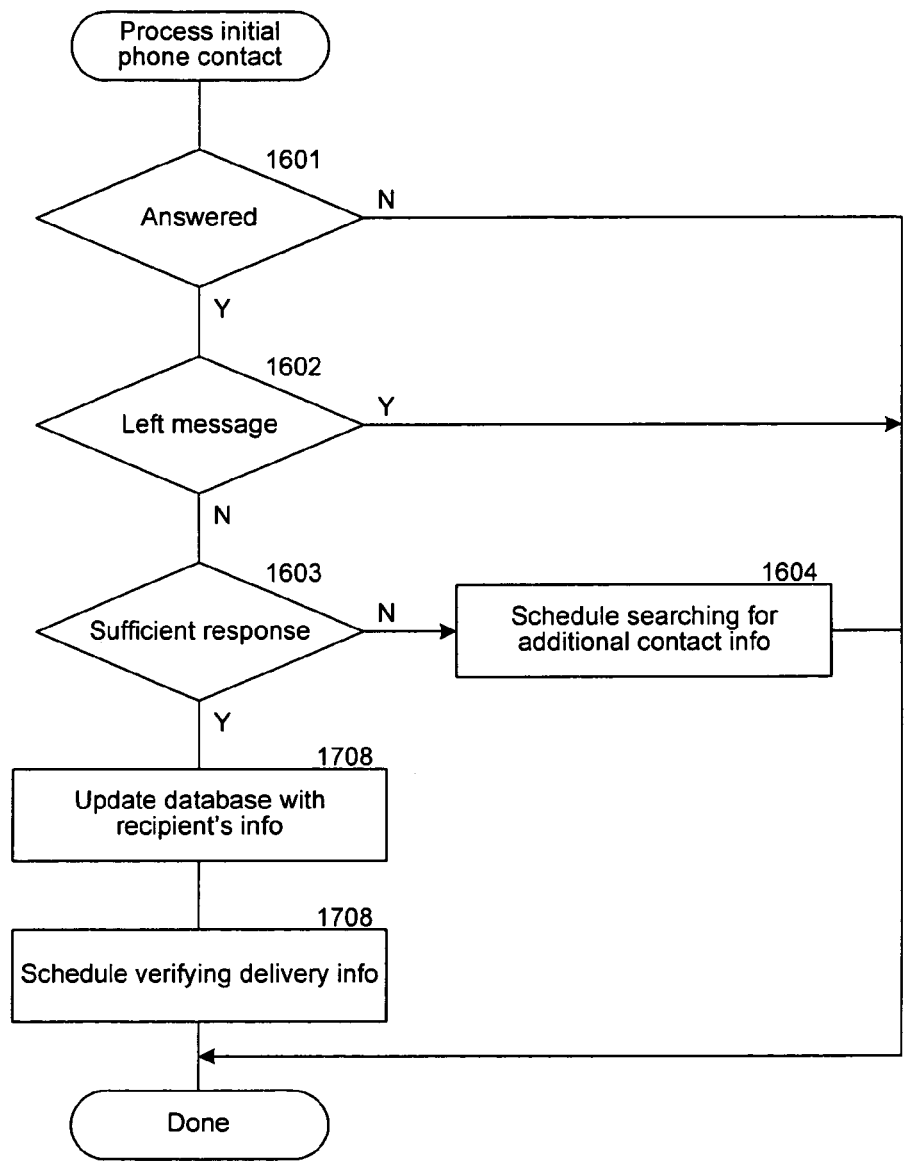
FIG. 16 is a flow diagram of a routine that controls the processing of the initial voice telephone contact.

FIG. 16 is a flow diagram of a routine that controls the processing of the initial voice telephone contact. This routine can either display information for a human operator or provide information to an automated operator. In step 1601, if the telephone has been answered, then the routine continues at step 1602, else the routine leaves the gift order still scheduled for initial contact. In step 1602, if a message is left either with a person or a voicemail system, then the routine continues at step 1603, else the routine leaves the gift order still scheduled for initial contact. In step 1603, if a sufficient response has been received, then the routine continues at step 1605, else the routine continues at step 1604. In step 1604, the routine schedules the gift order for searching for additional contact information relating to the recipient. In step 1605, the routine updates the order database with the additional information about the recipient. In step 1606, the routine schedules the gift order to have its delivery information verified and changes its state to verifying delivery information.

Figure 17:
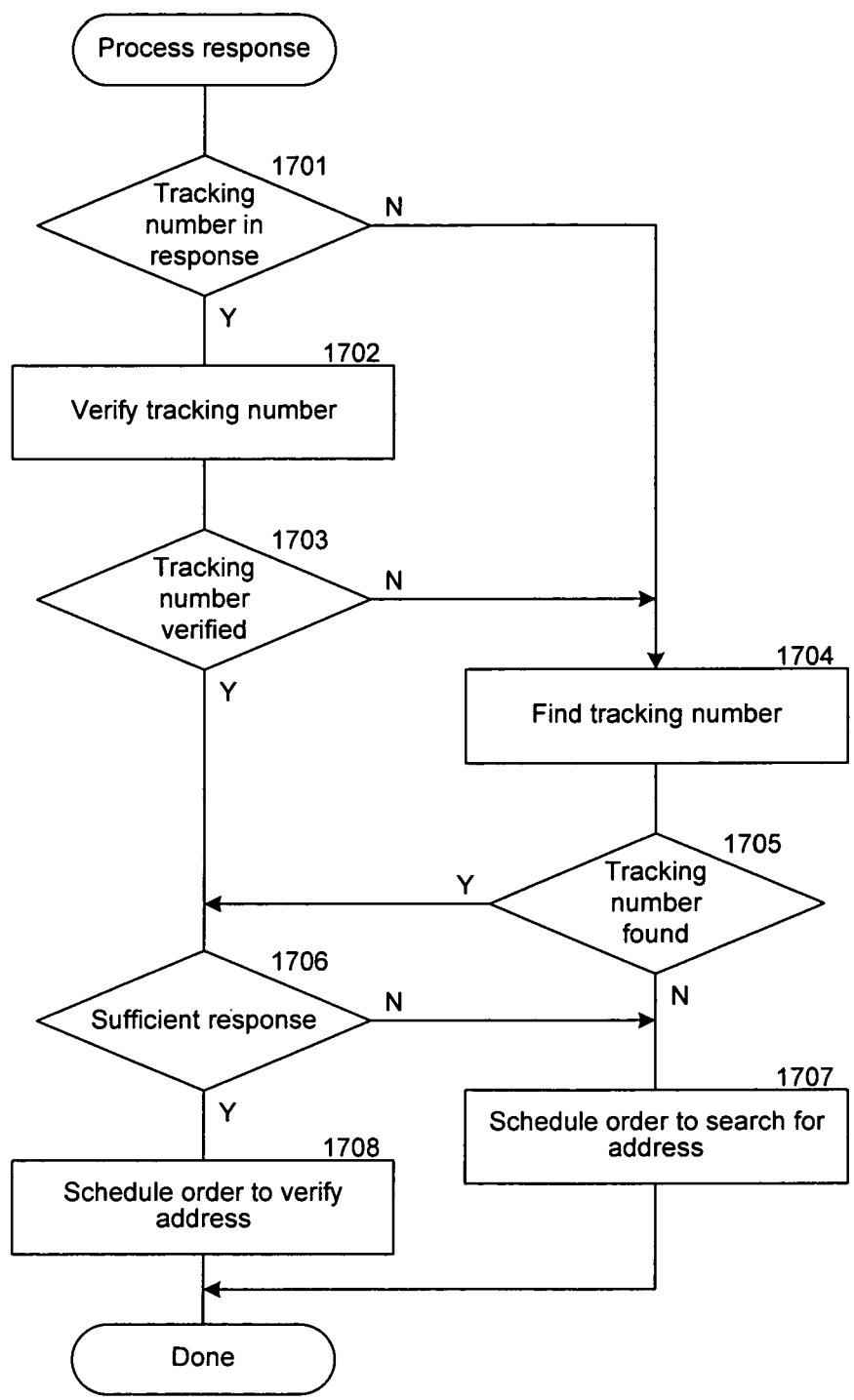
FIG. 17 is a flow diagram of a routine that controls the processing of the initial response.

FIG. 17 is a flow diagram of a routine that controls the processing of the initial response. The initial response can be via electronic mail, voice telephone, or facsimile message. In step 1701, if the tracking number is included in the response, then the routine continues at step 1702, else the routine continues at step 1704. In step 1702, the routine verifies the tracking number using the gift order database. In step 1703, if the tracking number has been verified, then the routine continues at step 1706, else the routine continues at step 1704. In step 1704, the routine attempts to find the tracking number based on the information provided in the response. In step 1705, if the tracking number can be found, then the routine continues at step 1706, else the routine continues at step 1707. In step 1706, if the response contains sufficient delivery information so that the gift order can be delivered, then the routine continues at step 1708, else the routine continues at step 1707. In step 1707, the routine schedules the order for searching for additional delivery information. In step 1708, the routine schedules the order to have its delivery information verified and changes its state to verify delivery information.

Figure 18:
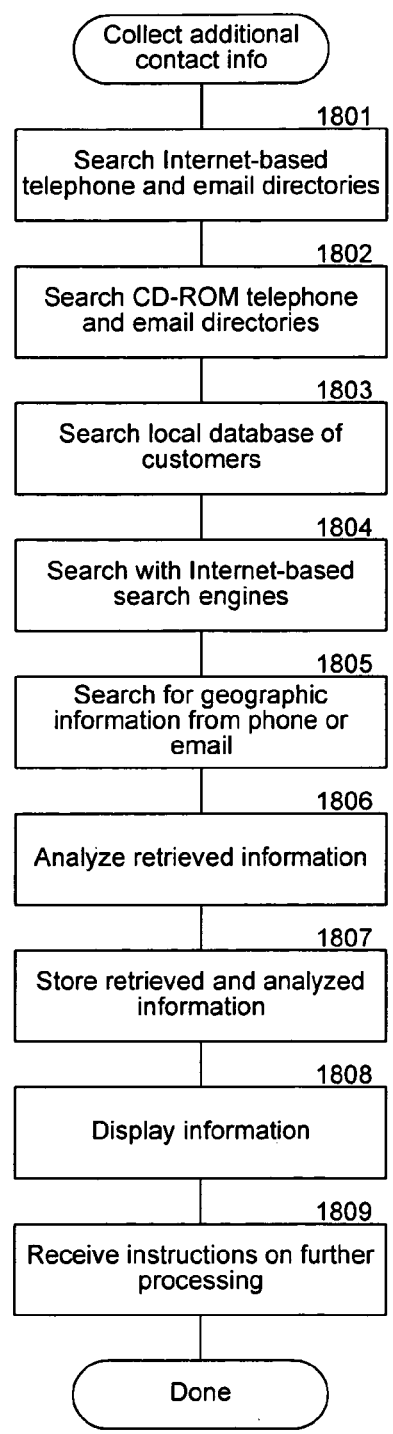
FIG. 18 is flow diagram of a routine that controls the collecting of additional contact information.

FIG. 18 is flow diagram of a routine that controls the collecting of additional contact information. This routine searches various database sources based on the information provided in the gift order. For example, in step 1801, the routine searches Internet-based telephone and electronic mail directories, such as Switchboard, Four11, and Accumail. In step 1802, the routine searches various CD-ROM databases of telephone and electronic mail information, such as SelectPhone. In step 1803, the routine searches the local database of customer information. The local database of customer information contains information of previous recipients and gift givers. In step 1804, the routine searches various Internet-based search engines, such as Digital Equipment's Alta Vista or Infoseek's Ultraseek. In step 1805, the routine uses the electronic mail address or telephone number to identify the geographic location of the recipient. In particular, the routine accesses the InterNIC Registration Services of Network Services for the domain name registration of the recipient's electronic mail address. Alternatively, the routine accesses the standard table of area codes and telephone number prefixes to determine the geographic locale of the recipient. The gift delivery system can use each of these information sources, a subset of these information source, or additional information source to locate the additional information. In step 1806, the routine analyzes the retrieved information to determine the information that most likely corresponds to the recipients based on geographic or contextual matches. This analysis may be done electronically or interactively with a human operator. In step 807, the routine stores the retrieved and analyzed information and the gift order database. In step 808, the routine displays the information to a human operator and requests instructions on further processing. The instructions can either be to place the order on hold because sufficient delivery information has not been collected, send an initial contact to the recipient, or proceed with delivery of the gift.

Figure 19:
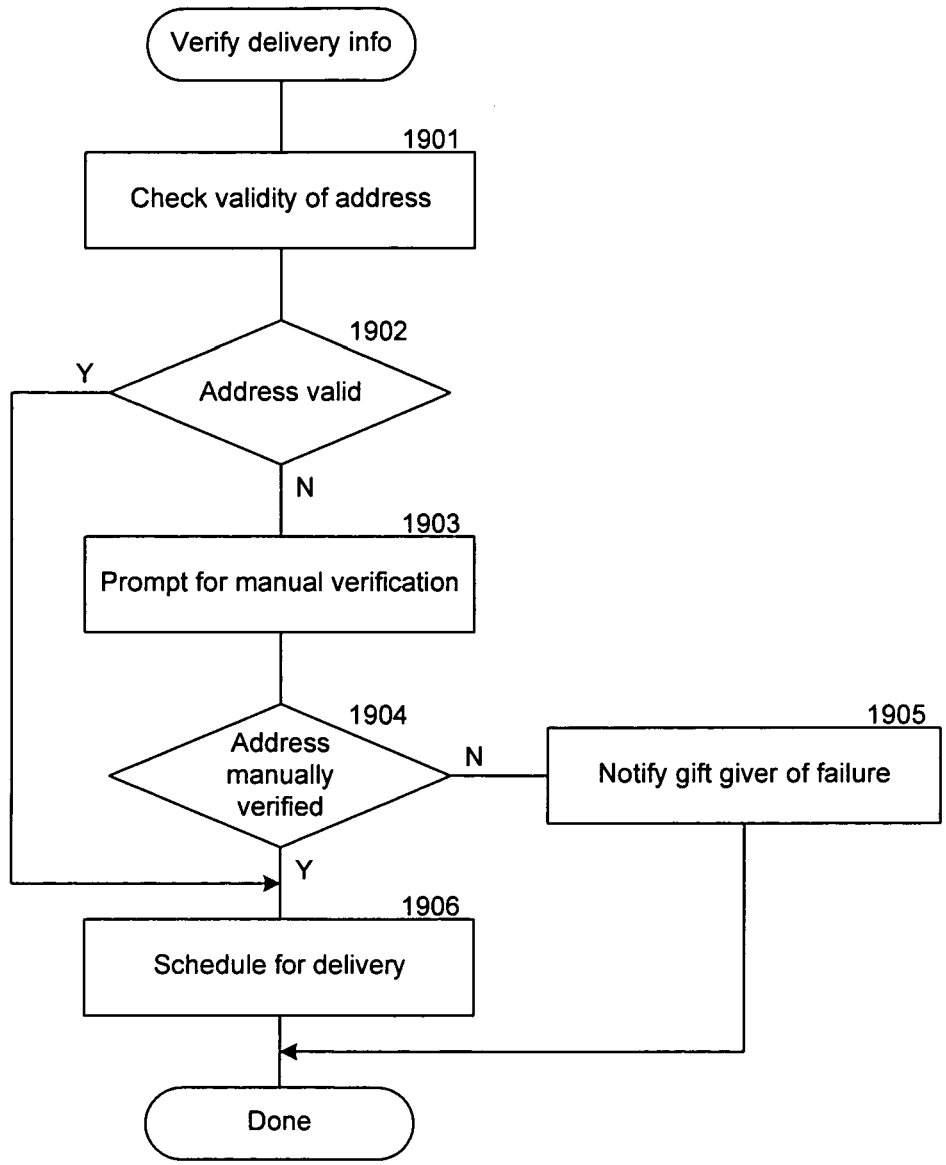
FIG. 19 is a flow diagram of a routine that controls the verifying of the delivery information.

FIG. 19 is a flow diagram of a routine that controls the verifying of the delivery information. The gift delivery system verifies the delivery information to ensure that the gift is being sent to a deliverable address. In step 1901, the routine checks the validity of the delivery information automatically. The routine uses a database of U.S. Postal Service addresses to determine whether the delivery address is a valid U.S. Postal Service address. In step 1902, if the address is valid, then the routine continues at step 1906, else the routine continues at step 1903. In step 1903, the routine prompts a human operator for manual verification of the address. In step 1904, if the operator has manually verified the address, then the routine continues at step 1906, else the routine continues at step 1905. In step 1905, the routine notifies the gift giver that the order cannot be fulfilled and places the order on hold. In step 1906, the routine schedules the gift for delivery and notifies the gift giver accordingly.

Although the present invention has been described in terms of various embodiments, it is not intended that the invention be limited to these embodiments. Modification within the spirit of the invention will be apparent to those skilled in the art. For example, the server system can map a client identifier to multiple customers who have recently used the client system. The server system can then allow the user to identify themselves by selecting one of the mappings based preferably on a display of partial purchaser-specific order information. Also, various different single actions can be used to effect the placement of an order. For example, a voice command may be spoken by the purchaser, a key may be depressed by the purchaser, a button on a television remote control device may be depressed by the purchaser, or selection using any pointing device may be effected by the purchaser. Although a single action may be preceded by multiple physical movements of the purchaser (e.g., moving a mouse so that a mouse pointer is over a button), the single action generally refers to a single event received by a client system that indicates to place the order. Finally, the purchaser can be alternately identified by a unique customer identifier that is provided by the customer when the customer initiates access to the server system and sent to the server system with each message. This customer identifier could be also stored persistently on the client system so that the purchaser does not need to re-enter their customer identifier each time access is initiated. The scope of the present invention is defined by the claims that follow.

The invention claimed is:

1. A computer-implemented method for ordering an item using a client system, the method comprising:
    displaying information identifying the item at the client computer system;
    receiving from a user an indication of a recipient to whom the ordered item is to be delivered;
    displaying an indication of an action that is to be performed by the user to order the item; and
    in response to the indicated action being performed, sending to a server system an indication that the item is to be ordered and the indication of the recipient to whom the ordered item is to be delivered
    whereby when the server system does not have sufficient information for the indicated recipient to deliver the ordered item, the server system automatically obtains additional information from one or more external information sources other than the user that is sufficient to deliver the ordered item to the indicated recipient.

2. The method of claim 1 wherein the indication of the recipient is an electronic mail address.

3. The method of claim 1 wherein the displaying of the information identifying the item and the displaying of the indication of the action to be performed are performed before the receiving of the indication of the recipient from the user.

4. The method of claim 1 wherein the client system and the server system communicate via the Internet.

5. The method of claim 1 wherein sending includes sending an identifier of the client system.

6. The method of claim 1 wherein the displaying is effected by displaying an HTML document provided by the server system.

7. The method of claim 1 wherein the action is a single action.

8. The method of claim 7 wherein the single action is clicking a mouse button when a cursor is positioned over a predefined area of the display.

9. The method of claim 1 wherein the server system obtains the additional information by contacting the recipient directly.

10. The method of claim 9 wherein the recipient is contacted directly via electronic mail.

11. The method of claim 9 wherein the recipient is contacted directly via a voice telephone call.

12. The method of claim 1 wherein the server system obtains the additional information by collecting information from one or more information sources selected from among an Internet-based telephone database, an Internet-based electronic mail database, a local telephone database, a local electronic mail database, an Internet-based search engine, and a database of information relating to the domain name registration of an electronic mail address of the recipient.

13. The method of claim 1 wherein the server system obtains the additional information by collecting information from one or more information sources selected from among an Internet-based telephone database, an Internet-based electronic mail database, a local telephone database, a local electronic mail database, an Internet-based search engine, and a database of information relating to the domain name registration of an electronic mail address of the recipient.

14. A computer-implemented method for ordering an item, the method comprising:
sending to a client system instructions to display information identifying the item, to input an indication of a recipient to whom the item is to be delivered, and to send the indication of the recipient to the server system when an indicated single action is performed; and
after the indicated single action is performed,
receiving the indication of the recipient from a user of the client system;
determining whether the server system does not have sufficient information for the indicated recipient to deliver the ordered item; and
when the server system does not have sufficient information, automatically obtaining additional information from one or more information sources other than the user that is sufficient to deliver the ordered item to the indicated recipient, the one or more information sources being external to the server system.

15. The method of claim 14 wherein the server system obtains the additional information by contacting the recipient directly.

16. The method of claim 15 wherein the recipient is contacted directly via electronic mail.

17. The method of claim 15 wherein the recipient is contacted directly via a voice telephone call.

18. The method of claim 15 wherein the server system obtains the additional information by collecting information from one or more information sources selected from among an Internet-based telephone database, an Internet-based electronic mail database, a local telephone database, a local electronic mail database, an Internet-based search engine, and a database of information relating to the domain name registration of an electronic mail address of the recipient.

19. The method of claim 14 wherein the indication of the recipient is an electronic mail address.

20. The method of claim 14 wherein the displaying of the information identifying the item and the displaying of the indication of the action to be performed are performed before the receiving of the indication of the recipient from the user.

21. The method of claim 14 wherein the client system and the server system communicate via the Internet.

22. The method of claim 14 wherein receiving includes receiving an identifier of the client system.

23. The method of claim 14 wherein the instructions are within an HTML document.

24. A computer-implemented method for ordering an item using a client system, the method comprising:
displaying information identifying the item at the client computer system;
receiving from a user an identifier of a group of one or more recipients to whom the ordered item is to be delivered, the identified group having an indication of each recipient in the group;
displaying an indication of an action that is to be performed by the user to order the item; and
in response to the indicated action being performed, sending to a server system an indication that the item is to be ordered and the indication of each recipient in the group to whom the ordered item is to be delivered
whereby when the server system does not have sufficient information for an indicated recipient to deliver the ordered item, the server system automatically obtains additional information from one or more external information sources other than the user that is sufficient to deliver the ordered item to the indicated recipient.

25. The method of claim 24 wherein the indication of a recipient is an electronic mail address.

26. The method of claim 24 wherein the displaying of the information identifying the item and the displaying of the indication of the action to be performed are performed before the receiving of the identifier of the group from the user.

27. The method of claim 24 wherein the client system and the server system communicate via the Internet.

28. The method of claim 24 wherein sending includes sending an identifier of the client system.

29. The method of claim 24 wherein the displaying is effected by displaying an HTML document provided by the server system.

30. The method of claim 24 wherein the action is a single action.

31. The method of claim 30 wherein the single action is clicking a mouse button when a cursor is positioned over a predefined area of the display.

32. The method of claim 30 wherein the server system obtains the additional information by contacting a recipient directly.

33. The method of claim 32 wherein the recipient is contacted directly via electronic mail.

34. The method of claim 32 wherein the recipient is contacted directly via a voice telephone call.

35. A method in a computer system for coordinating the delivery of a gift given by a gift giver to a recipient, the method comprising:
automatically receiving an order from the gift giver, the order identifying a gift to be delivered to the recipient and having contact information describing the recipient;
storing the received order by the computer system in a computer system order database along with an order tracking number;
automatically sending a communication by the computer system to the recipient based on the contact information, the communication requesting delivery information for the gift, the communication including the order tracking number so that the recipient can include the order tracking number in a response to the communication for identification of the stored order
when the recipient does not respond to the communication, automatically collecting additional delivery information for the gift based on the contact information from sources other than the gift giver;
when potential delivery information for the gift has been identified, automatically verifying by the computer system whether the potential delivery information is valid; and
when the delivery location has been verified as being valid, automatically directing delivery of the gift by the computer system in accordance with the delivery information; and automatically notifying the gift giver by the computer system that the gift has been sent to the recipient.

36. The method of claim 35 wherein the sending of a communication includes sending an electronic mail message.

37. The method of claim 35 wherein the order is received via access through a Web page.

38. The method of claim 35 wherein the delivery information is an address and where the verifying includes:

checking a database of valid addresses to determine whether the address can be determined to be a valid address; and when the address can be determined to be a valid address, indicating that the delivery information has been verified; and when the address cannot be determined to be a valid address, prompting a person to indicate whether the address is valid; and when the person indicates that the address is valid, indicating that the delivery information has been verified.

39. The method of claim 35 wherein the collecting of additional delivery information includes collecting information from one or more information sources that include an Internet-based telephone database, an Internet-based electronic mail database, a local telephone database, a local electronic mail database, a database of previous recipients and gift givers, an Internet-based search engine, and a database of information relating to the domain name registration of an electronic mail address of the recipient.

40. The method of claim 35 wherein the communications is a telephone call placed to the recipient.

41. The method of claim 35 including when the gift cannot be delivered to the recipient, notifying the gift giver that the gift cannot be delivered.

42. A computer-based gift delivery system for coordinating the delivery of a gift from a gift giver to a recipient, the system comprising:

an order entry component configured to provide a selection of available gifts, to receive a selection of a gift, to receive contact information describing the recipient, and to store the gift order; and a gift delivery component configured to retrieve the stored gift order, configured to determine whether the contact information includes sufficient delivery information to deliver the gift to the recipient, configured to obtain, responsive to determining that sufficient delivery information is not included, additional information about the recipient by attempting to contact the recipient and by searching various databases of information, at least one said database exterior to the computer system, and configured to direct the sending of the gift to the recipient when sufficient delivery information has been obtained.

43. The gift delivery system of claim 42 wherein the order entry component assigns an order tracking identification to each gift order and wherein the gift delivery component includes the order tracking identification when attempting to contact the recipient.

44. The gift delivery system of claim 42 wherein the gift delivery component searches various Internet-based databases using the recipient name or electronic mail address.

45. The gift delivery system of claim 42 wherein the order entry component receives payment electronically.

46. The gift delivery system of claim 42 wherein the order entry component is accessed via Web pages.

47. A method in a computer system for coordinating the delivery of a gift given by a gift giver to a recipient, the method comprising:

automatically receiving an order from the gift giver, the order identifying a gift to be delivered to the recipient and having contact information relating to the recipient;

storing the received order by the computer system in an order database in association with an order tracking number;

automatically identifying an electronic mail address for the recipient using the contact information received from the gift giver;

automatically sending a first electronic mail message by the computer system to the recipient based on the contact information, the first message requesting delivery information for the gift, the first message including the order tracking number so that the recipient can include the order tracking number in a response to the first message for identification of the stored order;

when a second electronic mail message that responds to the first electronic mail message sent to the recipient is received from the recipient and the received second message has sufficient delivery information, automatically retrieving the order tracking number and the delivery information from the received second electronic mail message;

automatically retrieving from the order database the order associated with the retrieved order tracking number;

automatically directing delivery of the gift of the retrieved order in accordance with the retrieved delivery information; and automatically sending a third electronic mail message to the gift giver indicating that the gift is being delivered to the recipient; and when a second electronic mail message that responds to the first electronic mail message sent to the recipient is received from the recipient but the received second message does not have sufficient delivery information or when no second electronic mail message is received, automatically sending a third electronic mail message by the computer system to the gift giver, the third message indicating that the gift cannot be delivered to the recipient and including the order tracking number so that the gift giver can include the order tracking number for identification of the stored order in a response to the third message that provides additional contact information.

48. The method of claim 47 wherein the identifying of an electronic mail address includes accessing one or more web sites for locating the electronic mail address of the recipient.

49. The method of claim 47 including:

upon receiving the additional contact information, sending an electronic mail message to the recipient based on the additional contact information, the message requesting delivery information for the gift, the message including the order tracking number so that the recipient can include the order tracking number in a response to the message for identification of the stored order.

50. A computer system for ordering an item, the system comprising:

a component that sends to a client system instructions for displaying information identifying the item at the client computer system;

receiving from a user an indication of a recipient to whom the ordered item is to be delivered;

displaying an indication of an action that is to be performed by the user to order the item; and in response to the indicated action being performed, sending to a server system an indication that the item is to be ordered and the indication of the recipient to whom the ordered item is to be delivered; and a component of the server system that, when the server system does not have sufficient information for the indicated recipient to deliver the ordered item, obtains additional information from one or more external information sources other than the user that is sufficient to deliver the ordered item to the indicated recipient.

51. The computer system of claim 50 wherein the indication of the recipient is an electronic mail address.

52. The computer system of claim 50 wherein the displaying of the information identifying the item and the displaying of the indication of the action to be performed are performed by the client system before the receiving of the indication of the recipient from the user.

53. The computer system of claim 50 wherein the client system and the computer system communicate via the Internet.

54. The computer system of claim 50 wherein sending includes sending an identifier of the client system.

55. The computer system of claim 50 wherein the displaying is effected by displaying an HTML document provided by the computer system.

* * * * *